United States Patent
Budde

(10) Patent No.: US 6,614,604 B1
(45) Date of Patent: Sep. 2, 2003

(54) COLLAPSIBLE MAGNIFYING DEVICE, SYSTEM AND METHOD

(76) Inventor: Jodi D. Budde, 6491 Elmcrest Ave., White Bear Lake, MN (US) 55110

( * ) Notice: Subject to any disclaimer, the term of this patent is extended or adjusted under 35 U.S.C. 154(b) by 0 days.

(21) Appl. No.: 09/546,034

(22) Filed: Apr. 10, 2000

(51) Int. Cl.⁷ .................................................. G02B 7/02
(52) U.S. Cl. ...................................... 359/817; 359/822
(58) Field of Search ................................ 359/802, 803, 359/804, 806, 805, 807, 808, 809, 810, 811, 815, 817, 819, 822

(56) References Cited

U.S. PATENT DOCUMENTS

| | | | | |
|---|---|---|---|---|
| 1,264,267 A | | 4/1918 | Bugbee ........................ | 359/688 |
| 1,886,747 A | | 11/1932 | Schroder ...................... | 359/803 |
| 2,682,805 A | | 7/1954 | Tomasovic ................... | 359/509 |
| 2,682,806 A | | 7/1954 | Gordenier .................... | 359/817 |
| 3,409,347 A | | 11/1968 | Vogel ........................... | 359/808 |
| 3,409,348 A | | 11/1968 | Annis et al. .................. | 359/821 |
| 3,553,866 A | * | 1/1971 | Redford et al. ............... | 40/364 |
| 4,250,644 A | | 2/1981 | Jantzen ......................... | 40/367 |
| 4,415,106 A | * | 11/1983 | Connell et al. .............. | 224/221 |
| 4,491,434 A | | 1/1985 | Barr et al. ..................... | 40/362 |
| 4,568,148 A | * | 2/1986 | Onanian ....................... | 359/485 |
| 4,773,747 A | * | 9/1988 | Bresnahan ................... | 359/408 |
| 4,957,310 A | * | 9/1990 | Bissonnette ................... | 283/34 |
| 5,101,300 A | | 3/1992 | Hicks ........................... | 359/802 |
| 5,183,193 A | * | 2/1993 | Brandell ....................... | 224/219 |
| 5,400,936 A | * | 3/1995 | Jones et al. ................... | 224/222 |
| 5,477,633 A | * | 12/1995 | Leinberger .................... | 40/661 |
| 5,511,141 A | | 4/1996 | Peli .............................. | 385/116 |
| 5,552,932 A | * | 9/1996 | Schultz ........................ | 359/480 |
| 5,572,371 A | * | 11/1996 | Woolf .......................... | 359/802 |
| 5,572,814 A | | 11/1996 | Boram et al. .................. | 40/362 |
| 5,600,751 A | | 2/1997 | Peli .............................. | 385/116 |
| 5,818,634 A | * | 10/1998 | Richard et al. .............. | 359/565 |
| 6,023,377 A | * | 2/2000 | Slager .......................... | 359/802 |
| 6,055,115 A | * | 4/2000 | Davis ........................... | 359/800 |

OTHER PUBLICATIONS

Eschenbach Catalog 1998/99.
K–Resin, Styrene–Butadiene Copolymers, K–Resin Styrene–Butadiene Copolymers (SBC) KR01 Data Sheet, Jun. 1997.
K–Resin, Styrene–Butadiene Copolymers, K–Resin Styrene–Butadiene Copolymers (SBC) KR03 (KR03NW) Data Sheet, Jun. 1997.
K–Resin, Styrene–Butadiene Copolymers, K–Resin Styrene–Butadiene Copolymers (SBC) KK38 (Developmental) Data Sheet, Jun. 1997.
K–Resin Styrene–Butadiene Copolymers TIB 202 Injection Molding, 1997.

* cited by examiner

*Primary Examiner*—Ricky Mack
(74) *Attorney, Agent, or Firm*—Curtis D. Kinghorn

(57) ABSTRACT

An apparatus and method for magnifying visual media such as a map is disclosed. The apparatus has three main elements: a lens having a focal length, a visual media positioning assembly and a collapsible positioning assembly for positioning the lens with respect to the visual media positioning assembly. The lens is preferably a convex lens and provides magnification of a piece of visual media. The visual media assembly positions and protects a piece of visual media. The collapsible positioning assembly positions the lens a distance above the visual media so that the visual media is located closer to the lens than the lens' focal length. As a result, a magnified virtual image of the visual media is created. The collapsible positioning assembly cooperates with the lens and the visual media positioning assembly so that the entire combination of the lens, visual media positioning assembly and collapsible positioning assembly is substantially flat in its collapsed configuration and positions the lens at a predetermined position above the visual media when in its open or useable configuration. In one embodiment, the apparatus may also include a strap or other means for attaching the entire apparatus to a user's appendage such as an arm.

80 Claims, 21 Drawing Sheets

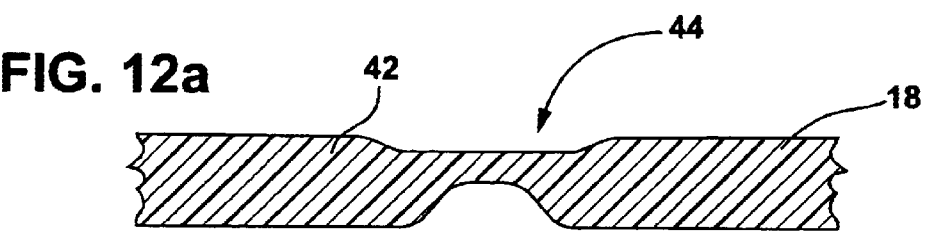
FIG. 12a
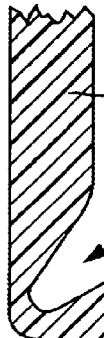 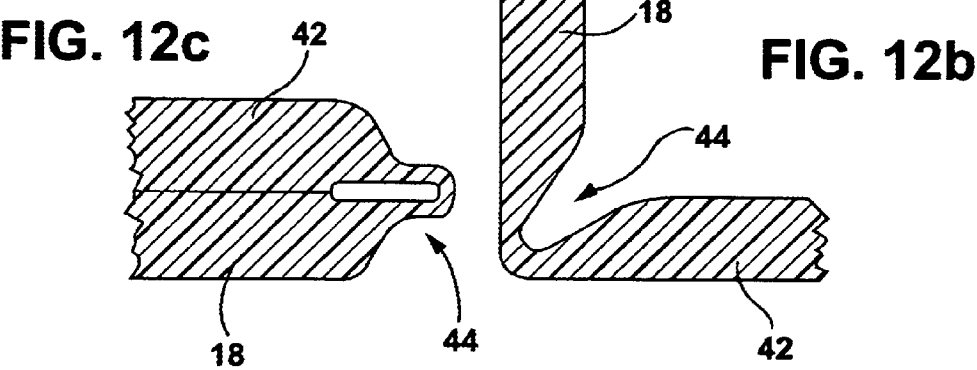
FIG. 12c
FIG. 12b

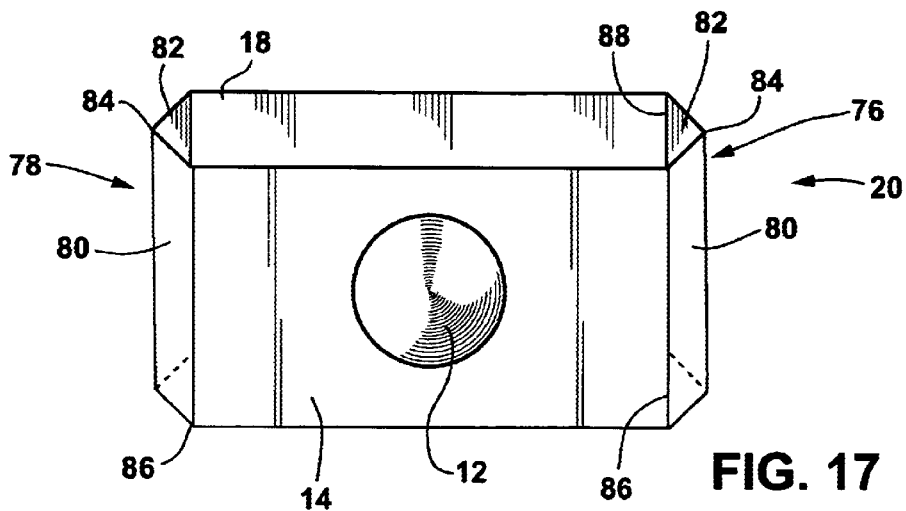
FIG. 17
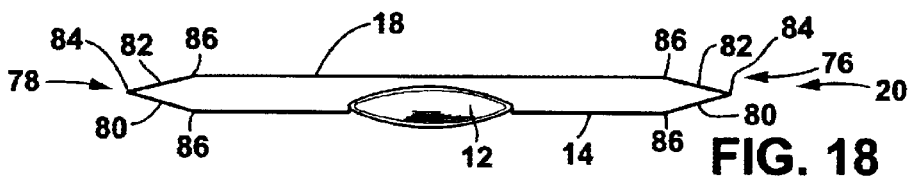
FIG. 18
FIG. 19
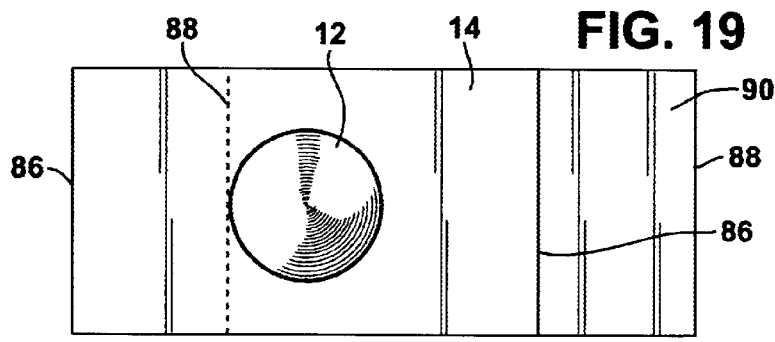
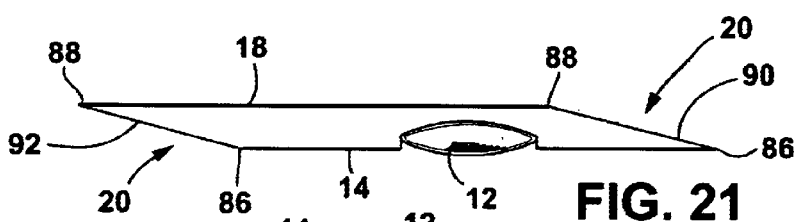
FIG. 21
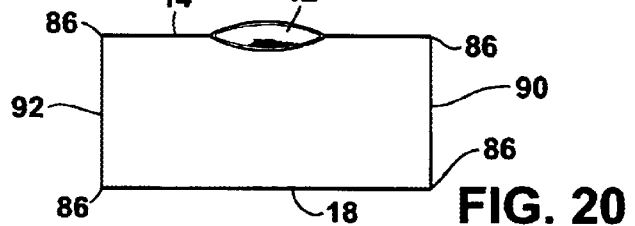
FIG. 20

COLLAPSIBLE MAGNIFYING DEVICE, SYSTEM AND METHOD

BACKGROUND OF THE INVENTION

1. Field of the Invention

The invention relates to a device for magnifying visual media and more particularly relates to a device for magnifying visual media that is collapsible when not in use.

2. Description of Related Art

Devices to optically magnify objects have been around for a long time. For example, in 1885, a quartz convex lens was found in the ruins of the palace of King Sennacherib of Assyria (705–681 B.C.). Aristophanes alluded to a "burning glass" in his comic play The Clouds (424 B.C.). The historian Pliny (23–79 A.D.) mentions that the Romans also had "burning-glasses". The Roman philosopher Seneca (3 B.C.–65 A.D.) describes that a water-filled glass globe would magnify objects.

Lenses can produce two different types of images: real and virtual. Real images are produced when light from a distant source passes through a converging lens. If the light source is beyond the focal point of the lens on a first side of the lens, the lens will produce a real image at the focal point of the lens on the side of the lens opposite the first side.

A virtual image is produced when an object is placed inside the focal length of a convex lens and viewed through the lens. The location of the virtual image is given by the equation:

$$1/p - 1/q = 1/f$$

where p is the distance of the object from the lens, q is the apparent distance of the image from the lens and f is the focal length of the lens. The magnification of the image that appears to be located at q is equal to q/p. So, for example, if the lens has a focal length of 3 cm and the object is placed 2 cm from the lens, the object will appear to be located 6 cm from the lens. In addition, the object will appear to be 3 times larger than it really is.

It is often useful to carry maps for reference in many activities. For example, skiers often carry maps to show the layout of the ski runs at ski resorts. These maps are typically made of paper and folded. To use the map, the skier must remove the map from a pocket, unfold it and attempt to read the map. Often, this is done under inclement conditions such as wind, snow or sleet. As a result, the map often becomes wet or otherwise physically disrupted making it difficult to read and susceptible to destruction.

Further, reading the map is often hampered by the usual practice of the skier wearing ski gloves so that the skier's manual dexterity is compromised. In addition, unfolding and refolding the map is often a cumbersome process. In view of the foregoing, it is often very difficult to read the map under conditions where the skier usually needs to read the map.

Devices exist for storing maps and the like on a user's arm, particularly a skier's arm. Examples of such devices are disclosed in U.S. Pat. Nos. "4,415,106 issued to Michael J. Connell and Ronald L. Swanson on Nov. 15, 1983 entitled "Map Holder", U.S. Pat. No. 4,957,310 issued to Michael R. Bissonnette on Sep. 18, 1990 entitled "Detachable Ski of Terrain Map", U.S. Pat. No. 5,400,936 issued to Richard M. Jones and Lynda W. Jones on Mar. 28, 1995 entitled "Arm Band Map Holder" and U.S. Pat. No. 5,477,633 issued to David C. Leinberger on Dec. 26, 1995 entitled "Document Holder for Wearer's Limb". However, in these devices, there are no means for optically enlarging the map or portion of the map that the user will view.

At least one device has been created to address this deficiency, at least in part. In U.S. Pat. No. 5,183,193 issued to Bernie Brandell on Feb. 2, 1993, entitled "Wrist Mounted Map Holder", a magnifying glass is attached to the user's arm by a flexible arm for viewing the map attached to the user's arm. However, the magnifying glass/arm assembly is cumbersome and is not compact.

SUMMARY OF THE INVENTION

The invention comprises an apparatus and a method for magnifying visual media such as a map. The apparatus has three main elements: a lens having a focal length, a visual media positioning assembly and a collapsible positioning assembly for positioning the lens with respect to the visual media positioning assembly.

The lens provides optical interaction with a piece of visual media. This optical interaction is preferably magnification. The visual media assembly positions and protects a piece of visual media. The collapsible positioning assembly positions the lens a distance above the visual media so that the visual media is located closer to the lens than the lens' focal length. As a result, a magnified virtual image of the visual media is created. The collapsible positioning assembly cooperates with the lens and the visual media positioning assembly so that the entire combination of the lens, visual media positioning assembly and collapsible positioning assembly is substantially flat in its collapsed configuration and positions the lens at a predetermined position above the visual media when in its open or useable configuration.

In the preferred embodiment, because the apparatus is substantially flat when collapsed, the apparatus may be easily carried as for example in a pocket or in a wallet. Alternately, the apparatus may also include a strap or other means for attaching the entire apparatus to a user's appendage such as an arm. The other means for attaching may include, but not be limited to, an appendage encircling band or strap to which the apparatus is attached. The means for attaching may also take the form of a string having opposed ends, one end attached to the apparatus and the other end attached to the user.

It is a primary object of the invention to provide a means for viewing visual media that allows the visual media to be magnified.

It is another object of the invention to provide a means for magnifying visual media that is substantially collapsible.

It is another object of the invention to provide a means for magnifying visual media that is conveniently carried and stored.

In one form of the invention, it is an object of the invention to provide a means for magnifying visual media that, in a collapsed configuration, substantially has the size and thickness about of a credit, business or playing card.

In one form of the invention, it is an object of the invention to provide a means for storing and magnifying a visual media that is attachable to the user.

These and other objects of the invention will be clear from the description of the invention given herein. Throughout the description, like reference numbers, wherever referred to and unless specifically stated otherwise, refer to like elements.

BRIEF DESCRIPTION OF THE DRAWINGS

FIG. 12a is a side view of a living hinge in a fully open position.

FIG. 12b is a side view of a living hinge in a half-open position.

FIG. 12c is a side view of a living hinge in a closed position.

FIG. 17 is a top view of an alternate embodiment of the invention in an extended configuration.

FIG. 18 is a side view of the embodiment of the invention of FIG. 17 in an extended configuration.

FIG. 19 is a top view of an alternate embodiment of the invention.

FIG. 20 is a side view of the embodiment of FIG. 19 in an open or extended configuration.

FIG. 21 is a side view of the embodiment of FIG. 19 in a closed or collapsed configuration.

DETAILED DESCRIPTION OF THE INVENTION

Figure 1:
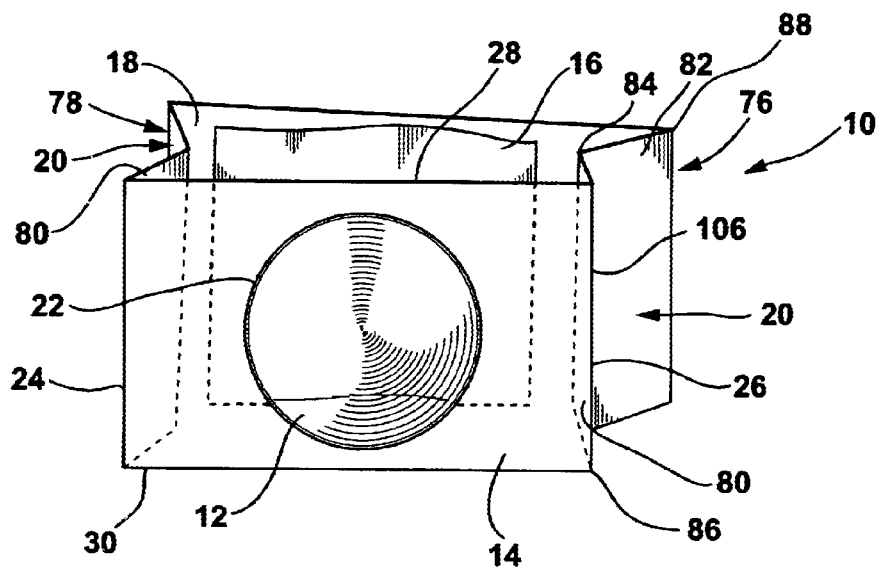
FIG. 1 is a perspective view of a preferred embodiment of the invention.
Figure 2:
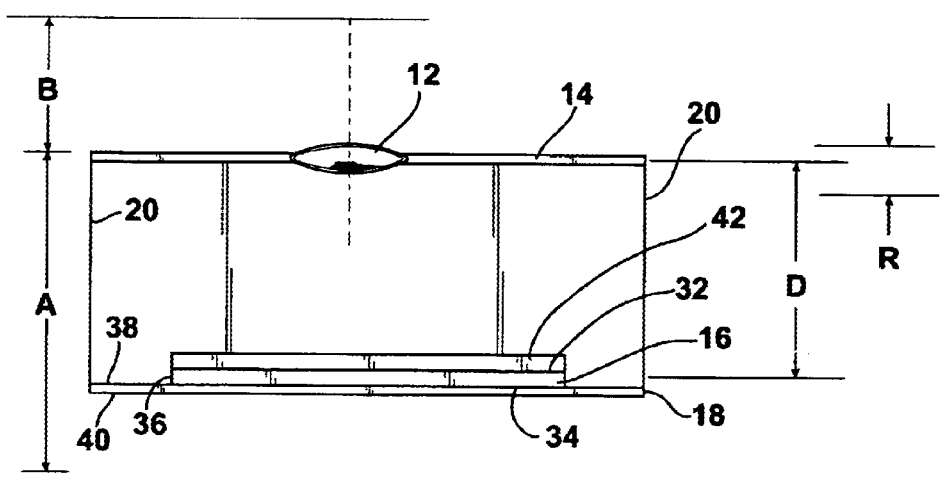
FIG. 2 is a side view of the embodiment of FIG. 1 in an open or extended configuration.
Figure 3:
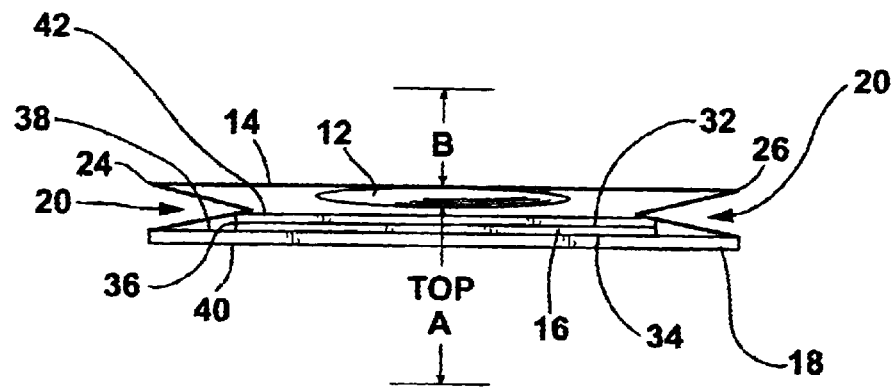
FIG. 3 is a side view of the embodiment of FIG. 1 in a closed or collapsed configuration.
Figure 4:
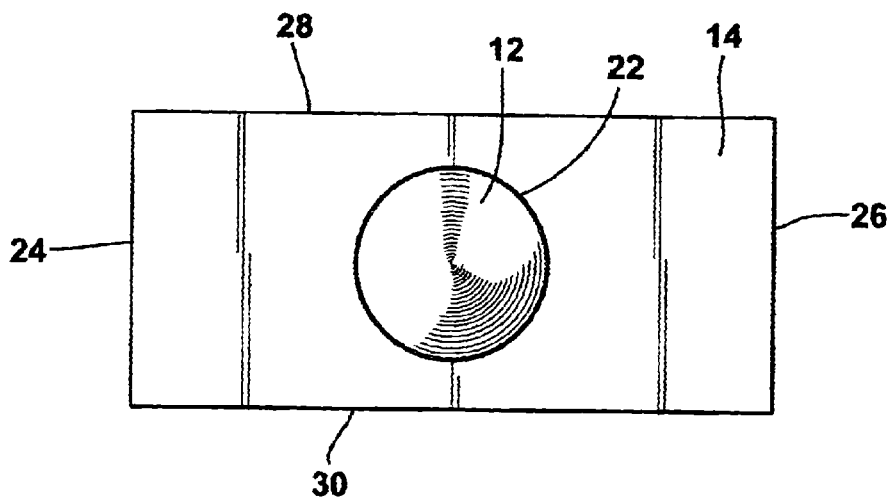
FIG. 4 is a top view of the lens and lens platform of the embodiment of FIG. 1.
Figure 5:
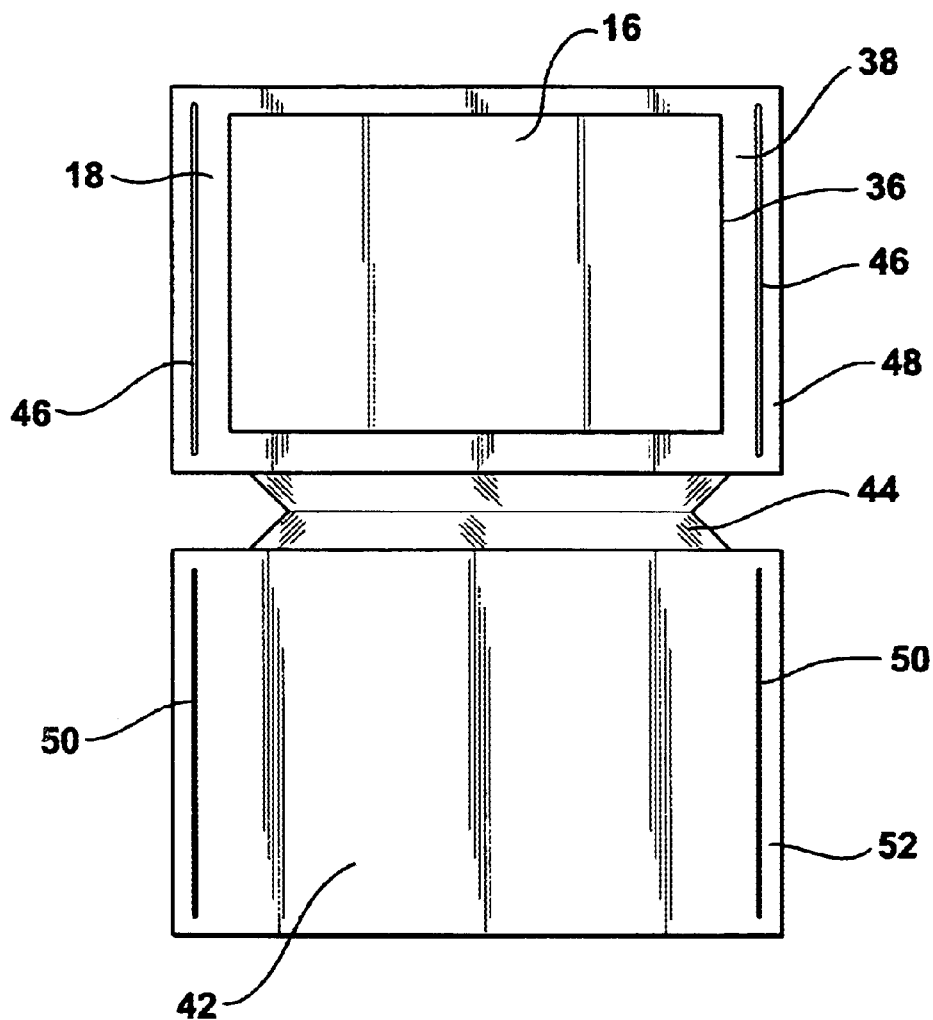
FIG. 5 is a top view of the document and document platform of the embodiment of FIG. 1.

The device that is shown as the invention in the Figures is generally labeled 10. Device 10 includes a lens 12, a lens platform 14, a document 16, a document platform 18 and a collapsible positioning member 20. FIGS. 1 through 5 show the preferred embodiment of the device 10.

Figure 6:
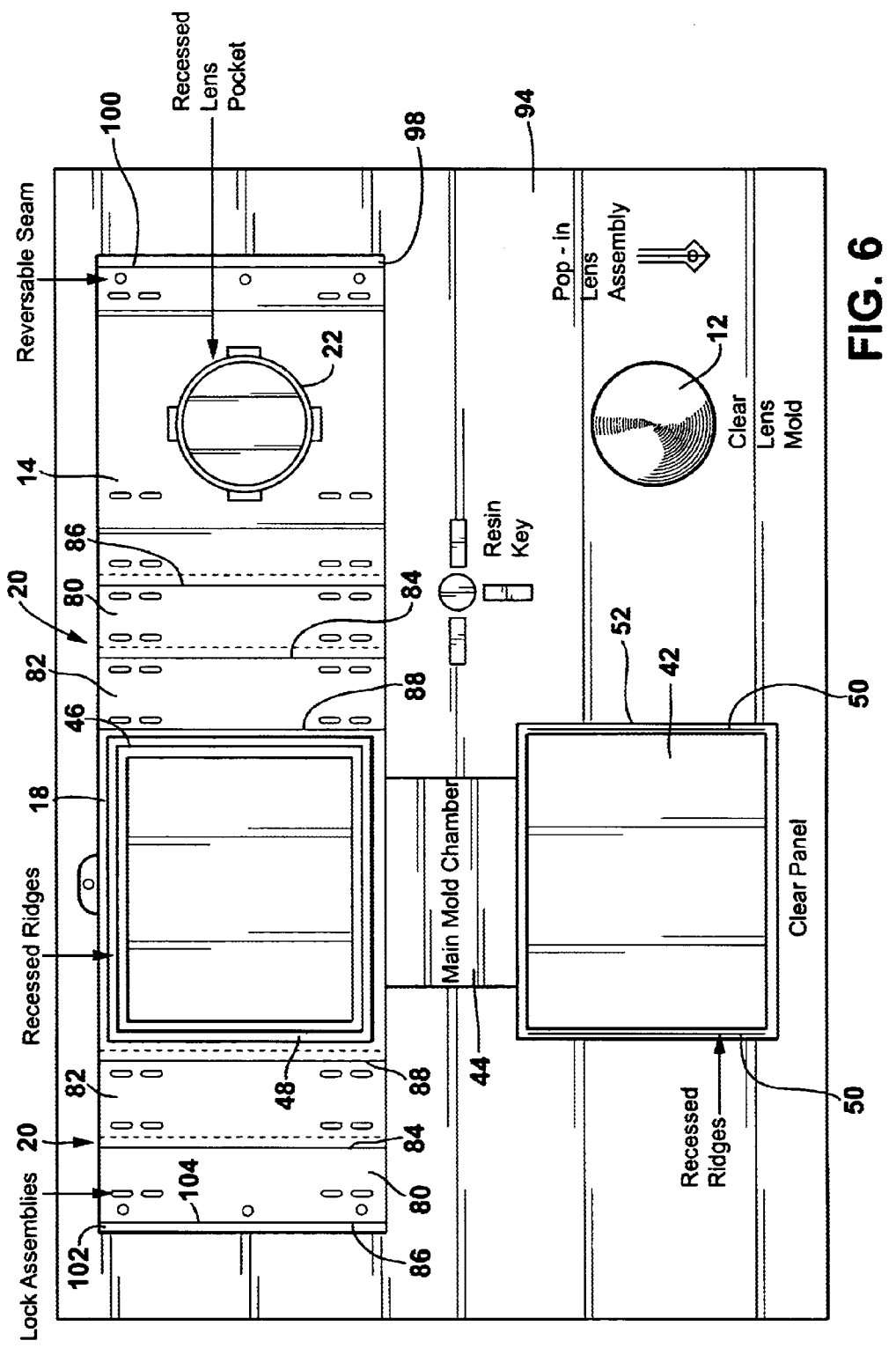
FIG. 6 is a top view of the invention shown in FIGS. 1–5 in an unassembled configuration in a mold.
Figure 7:
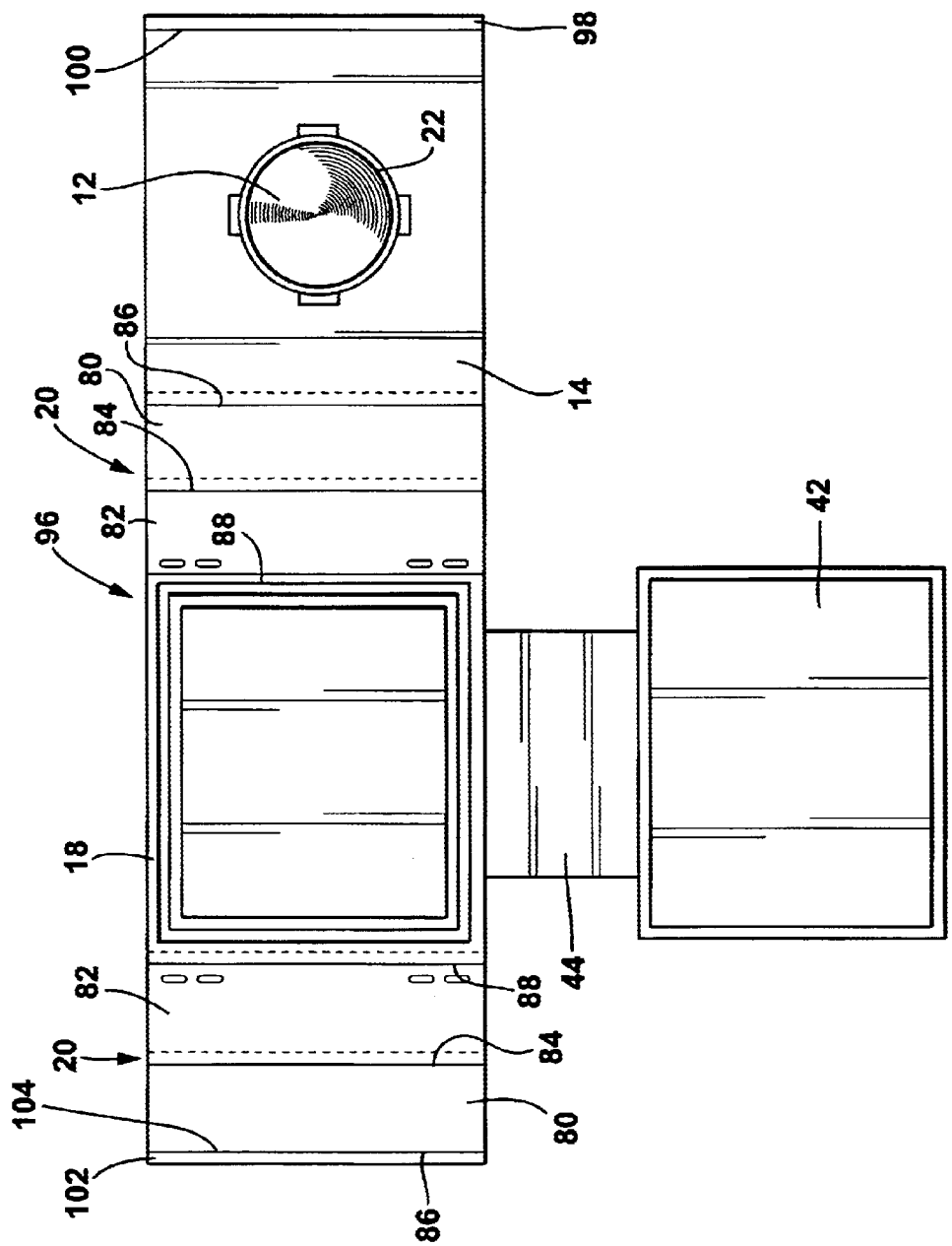
FIG. 7 is a top view of the invention shown in FIGS. 1–5 in an unassembled configuration removed from the mold.

FIGS. 6 and 7 show the preferred embodiment of the device 10 in a disassembled position. In this embodiment, device 10 is preferably made in a single planar integral unit in a mold by molding techniques well understood in the art. After the molding operation, the disassembled device 10 is manipulated, as described hereafter, to form the fully assembled device 10. Although the preferred embodiment of the invention has the entire disassembled device 10 made in an integral unit by molding, the invention 10 may be made of discrete parts that are then assembled as will be clear to those skilled in the art.

Lens 12 is attached to and positioned by lens platform 14. Lens 12 is preferably any convex lens but is more preferably a bi-convex or aspheric lens having a first focal length "A", a second focal length "B" and an outer edge 22. Focal lengths "A" and "B" correspond to the focal lengths of the lens 12 for light passing through the lens 12 from opposite sides of lens 12. First and second focal lengths "A" and "B" may be the same or different. Lens 12 may also be a Fresnel lens or a concave lens.

In the preferred embodiment, lens 12 is made of a lightweight durable plastic. Examples of such plastic include, but are not limited to, K-resin 38 or K-resin 01. K-resin is particularly adept as a material for lens 12 because K-resin is crystal clear, easily moldable and able to withstand a wide range of temperatures including, particularly, low temperatures. Further, K-resin will not leach chemical elements of plastics that can harm documents 16 if these elements come in contact with documents 16. Although K-resin or a similar material is preferred, lens 12 may be made of any clear material including, but not limited to glass or other plastics as will be clear to those skilled in the art.

Lens platform 14 is attached to and surrounds the outer edge 22 of lens 12. In the preferred embodiment shown in FIGS. 6.and 7, lens 12 and lens platform 14 are integrally formed in a mold as part of-the device 10 as a whole. As a result, both lens 12 and lens platform 14 are preferably made of K-resin 38 or K-resin 01 although other materials may be used as explained above.

Preferably, the outer edge 22 of lens 12 is circular having a preferred diameter of about 35 mm. Lens platform 14 is also preferably roughly rectangular although it may take many other shapes as explained below. Where lens platform 14 is rectangular, lens platform has opposed first and second sides 24, 26 and opposed third and fourth sides 28, 30. The preferred dimensions of lens platform 14 in this rectangular embodiment are between about 3.5 inches by 5 inches for first and second sides 24, 26 and third and fourth sides 28, 30, respectively. More preferably, the dimensions of lens platform 14 in this rectangular embodiment are between about 3 inches by 3.5 inches for first and second sides 24, 26 and third and fourth sides 28, 30, respectively. Most preferably, the dimensions of lens platform 14 in this rectangular embodiment are between about 2 inches by 3.5 inches for first and second sides 24, 26 and third and fourth sides 28, 30, respectively, roughly the dimensions of a playing card or a business or credit card.

In addition to having a generally circular outer edge configuration, the outer edge 22 of lens 12 may also take other shapes such as rectangular, square, hexagonal, octagonal, pentagonal, oval, freeform or a specific shape such as the outline of a state or country to name but a few choices that will occur to those skilled in the art. This is accomplished by taking a section out of lens 12 or forming lens 12 with an outer edge configuration in the shape of a rectangle, square, hexagonal, octagonal, pentagonal, oval, free-form or specific shape in a lens 12 otherwise as described above.

Document 16 may be any visual object that it is desirable to observe. However, document 16 is preferably a map of a desired location including, but not limited to, the ski runs at a ski resort, a road map, a topographical map or map of a golf course. Examples of other visual media that may make up document 16 include, but are not limited to, photographs, documents, blue prints or microfilm with all the variety of visual information that will occur to those skilled in the art. Document 16 may be provided with the device 10 or may be added by the user. In the preferred embodiment shown in FIGS. 1–5, document 16 is rectangular although document 16 may also have any desired shape including but not limited to square, circular, oval, freeform, octagonal or hexagonal. Document 16 may have these shapes regardless of the shape of document platform 18 as described hereafter or the shape of lens platform 14 or lens 12. Document 16 has an upper surface 32, a lower surface 34 and at least one outer edge 36.

Document platform 18 positions and provides support and protection for document 16. Document platform 18 has a first and a second surface 38, 40, respectively. First surface 38 of document platform 18 will be located directly next to document 16 while second surface 40 is located opposite document 16. Document platform 18 is also preferably rectangular although document platform 18 may also have any desired shape including but not limited to square, circular, oval, freeform, octagonal or hexagonal. Document platform 18 may have these shapes regardless of the shape of document 16 as described above or the shape of lens platform 14 or lens 12.

In one embodiment, document 16 is permanently affixed to document platform 18. This is preferably accomplished by placing the lower surface 34 of document 16 in contact with the first surface 38 of document platform 18 and placing a document cover 42 over document 16 so that document cover 42 contacts the upper surface 32 of document 16. In this way, document 16 is positioned or "sandwiched" between document platform 18 and document cover 42. Document cover 42 is preferably transparent and formed in the molding operation that creates the device 10 of FIGS. 6 and 7. A preferred material for document cover 42 is a lightweight plastic such as K-resin 38 or K-resin 01.

Document cover 42 is preferably affixed to document platform 18 by a hinge 44. In the preferred embodiment of FIGS. 6 and 7, both document cover 42 and hinge 44 are integrally formed with document platform 18 and of the same material as document platform 18 as device 10 is molded. Hinge 44 is preferably formed by folding the document cover 42 over document platform 18.

As mentioned above, document cover 42 can be permanently affixed to document platform 18. Preferably, this is done in an embodiment where document platform 18 has a series of recesses 46 along its outer periphery 48. A series of corresponding ridges 50 are formed in document cover 42 along the outer periphery 52 of document cover 42. Ridges 50 meet with recesses 46 to securely position document cover 42 with respect to document platform 18. In addition, ridges 50 and recesses 46 affix document cover 42 to document platform 18. This can by done by having a frictional fit between ridges 50 and recesses 46 or by using heat staking, ultrasonic welding or adhesives or some combination of these. Document cover 42 may alternately be permanently fastened to document platform 18 by means well understood in the art, including but not limited to, heat staking, ultrasonic welding or adhesives. Document cover 42 may preferably be about the same thickness as document platform 18 although it may be thicker or thinner as desired.

Document 16 may also be attached to and positioned on document platform 18 by an adhesive. Depending on the strength of the adhesive, as will be clear to those skilled in the art, the attachment between the document 16 and the document platform 18 may be either permanent or temporary. The adhesive may be used with or without the document cover 42.

Figure 8:
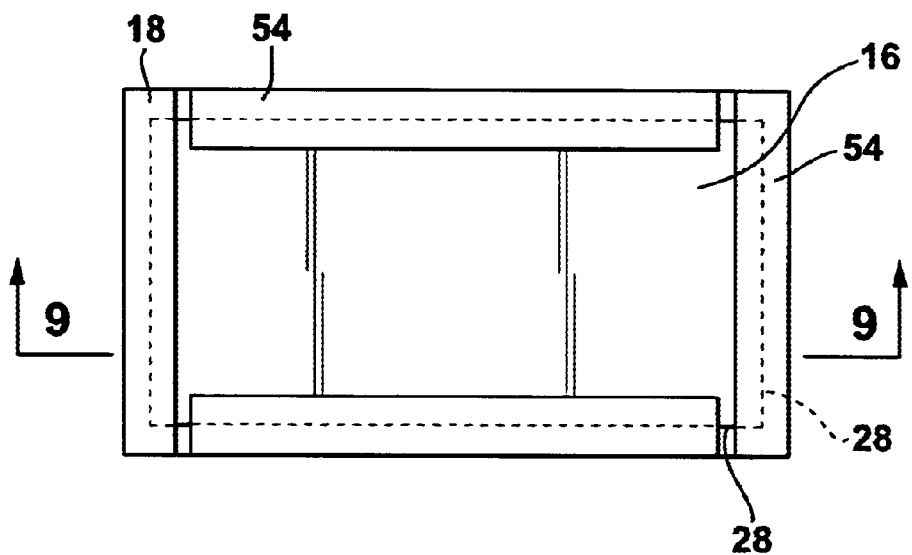
FIG. 8 is a top view of the document platform of an alternate embodiment of the invention for positioning the visual media.
Figure 9:
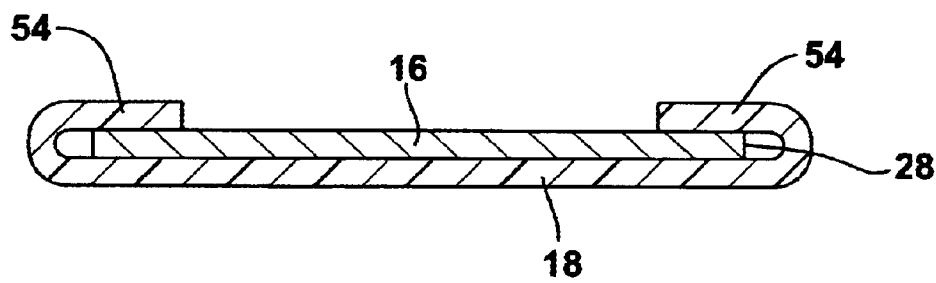
FIG. 9 is a side cross-sectional view of the embodiment of FIG. 8.

Alternately as shown in FIGS. 8 and 9, document 16 may be restrained by physical restraint members 54 located on document platform 18 dimensioned to wrap around and constrain the outer edges 28 of document 16. These physical restraint members 54 are preferably formed by molding the physical restraint members 54 in a plane at the time of molding and then folding the physical restraint members over document platform 18 before the plastic sets. Physical restraint members 54 are preferably about the same thickness as is document platform 18 although they may be thicker or thinner as desired.

Figure 10:
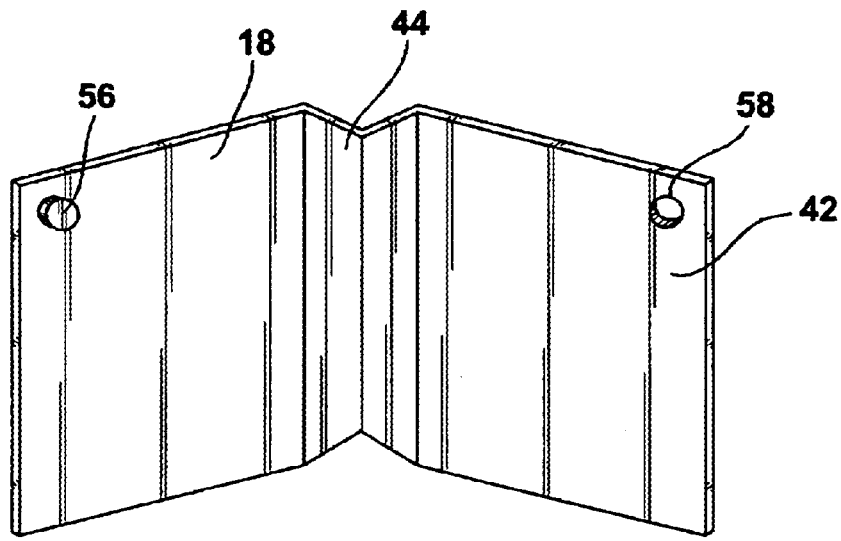
FIG. 10 is a perspective view of the mating post and hole assembly for removably connecting the document cover to the document platform.

Alternately, document 16 may be removably attached to document platform 18. As described above, this may be done using low strength adhesives. Alternately, this may be accomplished by placing document 16 between document platform 18 and document cover 42 as described above. However, document cover 42 may not be permanently affixed to document platform 18 as described above. Instead, document cover 42 is removably attached to document platform 18. This may be accomplished by a variety of means such as a mating post/hole configuration such as is shown in FIG. 10. In this embodiment, a mating post 56 extends from the document cover 18 and a hole 58 is formed in the first surface of the document platform 18. Mating post 56 and hole 58 are dimensioned so that friction between the mating post 56 and the hole 58 holds document cover 42 in contact with document platform 18. Obviously, mating post 56 may be located on document platform 18 while hole is formed in document cover 42 if desired. Other means for removably attaching document cover 42 to document platform 18 will occur to those skilled in the art.

Figure 11:
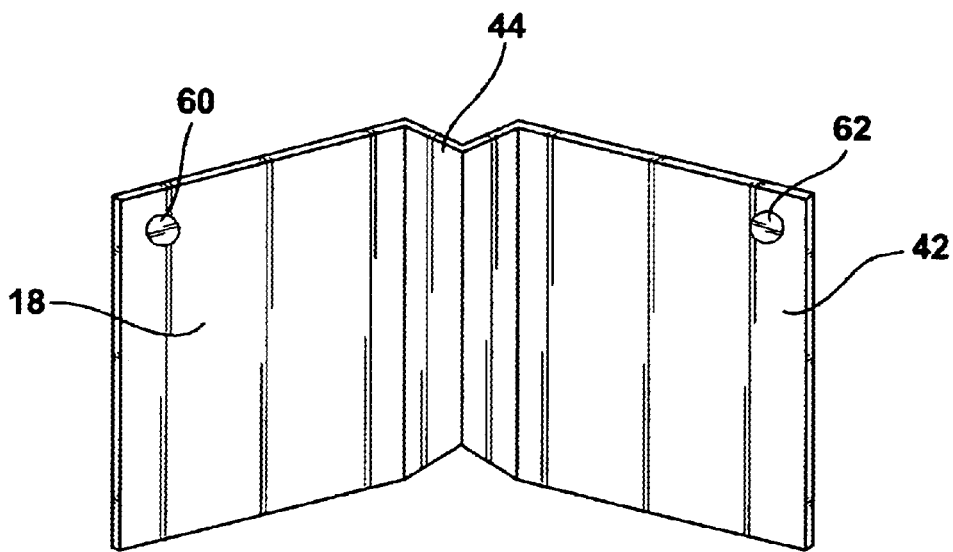
FIG. 11 is a perspective view of a magnet assembly for removably connecting the document cover to the document platform.

One such means, as shown in FIG. 11, has magnets 60 and 62, having opposite polarities, may be embedded in the material of document platform 18 and document cover 42 in alignment with each other. As the magnet 60 of document cover 18 is brought near the magnet 62 of document platform 18 as document cover 42 is moved into a position to "sandwich" document 16 between it and document platform 18, the attraction of the magnets 60, 62 holds document cover 42 in proximity to document platform 18. Although specific examples of removable connections between document platform 18 and document cover 42 have been given, it is clear that other such means will occur to those skilled in the art and are intended to be covered by the disclosure of this invention.

In these embodiments where there is a document cover 42 as described above, document cover 42 is preferably affixed to document platform 18 by a hinge 44. Both document cover 42 and hinge 44 are preferably integrally formed with document platform 18 of the same material as document platform 18 as device 10 is molded as shown in FIGS. 6 and 7. Hinge 44 is preferably a living hinge as is well understood in the art as is shown in FIGS. 12a–12c. Document platform 18, document cover 42 and hinge 44 are all preferably made of K-resin 38 or K-resin 01 although other materials may be used as explained above.

Figure 13:
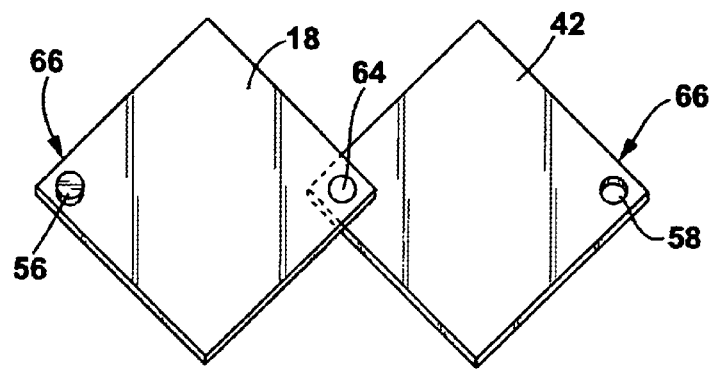
FIG. 13 is perspective view of a further alternate embodiment of the invention for positioning the visual media.

FIG. 13 shows a variant of the previous embodiments. In this embodiment, there is also a document cover 42. However, in this embodiment, document cover 42 is pivotally connected to document platform 18 by a pivot 64 that allows document cover 42 to be rotated away from document platform 18 to allow document 16 to be placed on document platform 18. Pivot 64 is a pin that extends through both document platform 18 and document cover 42 perpendicular to both document platform 18 and document cover 42. Pivot 64 allows document cover 42 to pivot around pivot 64. After document 16 is placed on document platform 18, document cover 42 is rotated toward document platform 18 to "sandwich" document 16 between document cover 18 and document cover 42. Pivot 64 keeps transparent document cover 42 in close and fixed association with document platform 18.

A stop 66 detachably connects document cover 42 to document platform 18. This is preferably accomplished by a shallow mating post 56 and hole 58 assembly such as is shown in FIG. 10. In this embodiment, the frictional connection between the mating post 56 and the hole 58 should be strong enough to securely connect the document cover 42 and the document platform 18 but not so strong as to make it difficult or impossible to move document cover 42 relative to document platform 18. Alternately, magnets such as magnets 60, 62 shown in FIG. 11 may be embedded in document platform 18 and document cover 42 to perform the function of stop 66 to hold document platform 18 and document cover 42 in close and fixed association. The location of pivot 64 and stop 66 or magnets 60, 62 may be varied as will occur to those skilled in the art so long as document cover 42 is able to pivot away from document platform 18 to allow document 16 to be placed on document platform 18.

In a preferred embodiment of device 10, document 16 is translucent. In this embodiment, document 16 is preferably a microfilm, lithographic, transparency, hand sketch, digitally scanned or reproduced picture or similar reproduction or document that allows light to pass through it.

In this embodiment, document platform 18 also allows light to pass through it. The entire document platform 18 may allow light to pass through it or document platform 18 may have a light transmission portion 68, corresponding roughly in dimensions to document 16, that allows light to pass through. At least light transmission portion 68 is preferably made of a material that is optically diffuse. If desired, the entire document platform 18 may be made of the same or similar optically diffuse material of light transmission portion 68.

Because at least light transmission portion 68 is optically diffuse, light passing through light transmission portion 68 is diffused. This diffusion eliminates individual variations in light impinging on light transmission portion 68 and presents light with a more uniform intensity to pass through and illuminate document 16.

Figure 14:
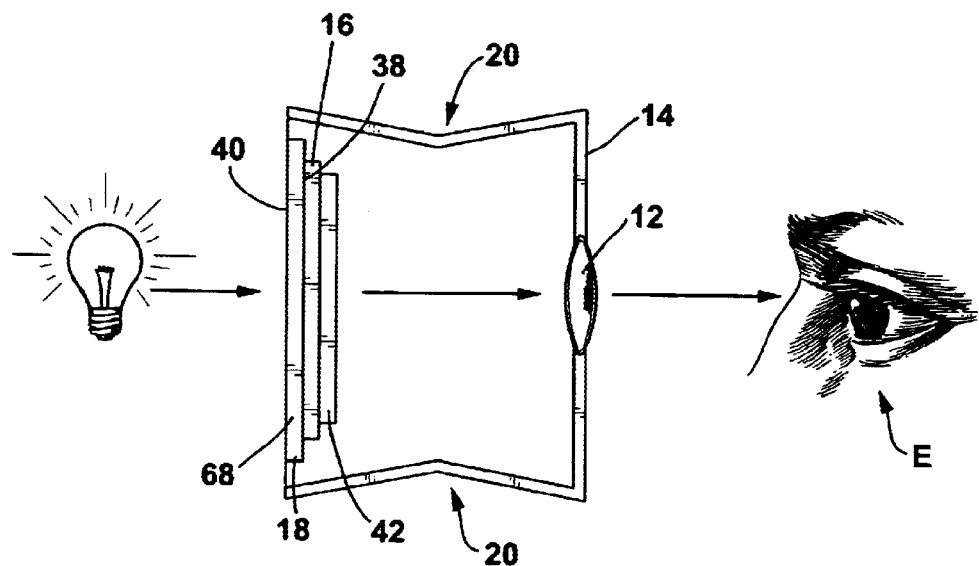
FIG. 14 is a side schematic view of the light path through an embodiment of the invention.

In this embodiment, as shown in FIG. 14, document 16 is illuminated by light impinging on the second surface 40, passing through document platform 18, out of document platform 18 at first surface 38, into and through document 16 and traveling through lens 12 to the viewer's eye "E". As a result, because document 16 is translucent, document 16 is then illuminated by the light passing through document 16 from behind document 16 to the user's eye.

In the embodiment above where document 16 is translucent, to view document 16, light must pass through document 16 from behind document 16. Therefore, in this embodiment as explained above, light must be allowed to pass through both document platform 18 and document 16. This light may either be ambient, such as sunlight, or provided by the invention itself. Where the light is ambient, the light path from the source of ambient light to and through the document platform 18 and document 16 must not be inhibited. This can be accomplished by allowing a straight-line path for light to pass from the light source to and through the document platform 18 and document 16 to the user's eye. To use this embodiment, the user holds the device 10 up to, for example, the sun, so that sunlight impinges on the second surface 40. From there, as described above, light passes through document platform 18, out of document platform 18 at first surface 38, into and through document 16 and travels through lens 12 to the viewer's eye.

Figure 15:
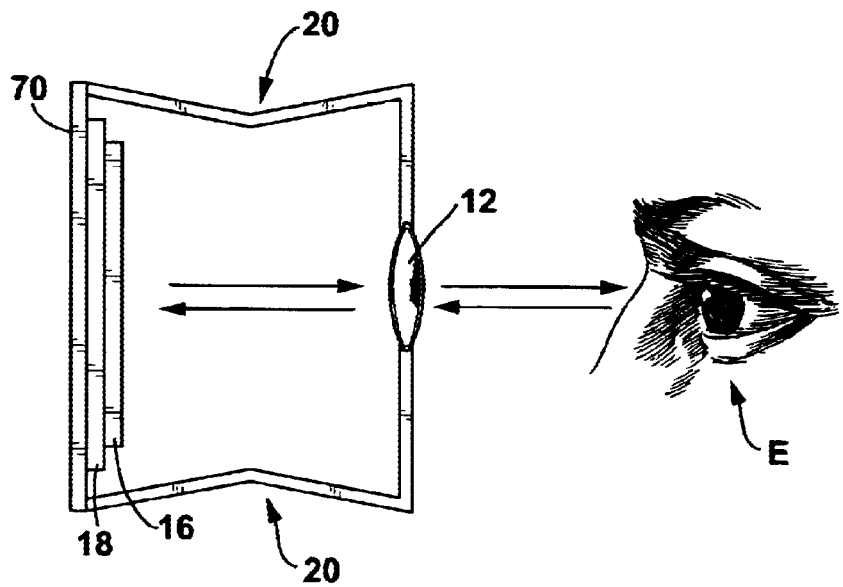
FIG. 15 is a side cross-sectional view of an alternate embodiment of the invention.

Alternately, as shown in FIG. 15, a mirror 70 may be attached to the second surface 40 of document platform 18.

In this embodiment, ambient light first passes through document 16 and document platform 18 where it is reflected off of mirror 70 and back through document platform 18 and document 16 to the user's eye. Of course, in the embodiments where a document cover 42 covers document 16 and there is a mirror 70, the light must also twice pass through document cover 42.

Figure 16:
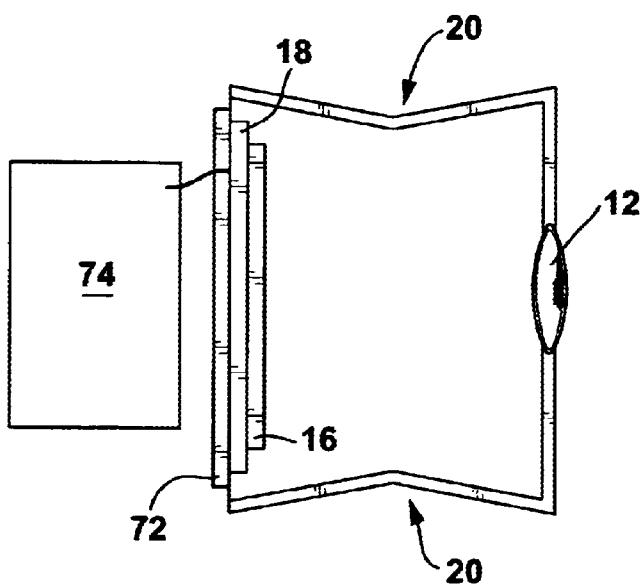
FIG. 16 is a side cross-sectional view of another alternate embodiment of the invention.

The light to illuminate document 16 may be provided by the device 10 itself. In an embodiment shown in FIG. 16, a light producing device 72 is placed behind and attached to document platform 18. Light producing device 72 produces light and directs it toward and through document 16. In this embodiment, light producing device 72 may be a light bulb or electronic display such as an LCD display or more particularly an active matrix LCD display such as is found, for example, in laptop computers as is well understood in the art.

In this embodiment, light-producing device 72 is preferably powered by a battery 74. Battery 74 may either be attached to device 10 or connected to light producing device 72 by an electrically connecting wire. Although battery 74 is the preferred method of powering light producing device 72, other power sources including, but not limited to, solar cells or a direct electrical connection to ordinary household alternating current may be used.

In an alternate embodiment of device 10, document 16 is opaque. In this embodiment, document 16 may also be a microfilm, lithographic, transparency, hand sketch, digitally scanned in or reproduced pictures or similar reproduction that does not allow light to pass through it. Where document 16 is opaque, document platform 18 need not be translucent or transparent although it may be. In this embodiment, document 16 is illuminated by light impinging on the upper surface 40 of document 16, being reflected away from document 16 and then traveling through lens 12 to the viewer's eye.

In either embodiment where document 16 is translucent or opaque, because document platform 18 positions document 16, document platform 18 must have dimensions at least as large as the dimensions of document 16 in whatever configuration document 16 takes. In the preferred embodiment where document 16 is rectangular, the dimensions of document platform 18 are preferably about the same as those given above for the lens platform 14.

As mentioned above, device 10 includes collapsible positioning member 20. Where lens 12 is a convex lens, the function of collapsible positioning member 20 is to position lens 12 away from document 16 so that document 16 is closer to lens 12 than focal length "A" to produce a magnified virtual image of document 16. In the preferred embodiment, collapsible positioning member 20 positions lens 12 a distance "D" from document 16 to produce a desired magnification. For example, if lens 12 has a focal length of 2.4 cm. and the desired magnification is 6 times, collapsible positioning member 20 should position lens 12 a distance of 2 cm. from document 16.

Where lens 12 is a bi-convex lens, collapsible positioning member 20 positions lens 12 away from document 16 within a range "R", characteristic of lens 12 as is well understood in the art, where the document 16 is in focus. When document 16 is a distance "R" from the bi-convex lens 12, document 16 will also appear to be magnified. Collapsible positioning member 20 allows lens platform 14 to move slightly side to side with respect to document platform 18. As lens platform 14 moves side to side, the distance of lens 12 to document 16 varies slightly. Bi-convex lens 12 allows document 16 to be in focus through the entire range of movement of lens platform 14 relative to document platform 18.

In the preferred embodiment shown in FIGS. 1–5, collapsible positioning member 20 comprises a first and a second collapsing member 76, 78. First and second collapsing member 76, 78 each have a first plate 80 and a second plate 82. A middle hinge 84 connects each combination of a first plate 80 and a second plate 82. First plate 80 is connected to lens platform 14 by an upper hinge 86. Second plate 82 is connected to document platform 18 by a lower hinge 88. Middle, upper and lower hinges 84, 86 and 88 allow each combination of first and second plates 80, 82 to move from an "open" configuration shown in FIG. 2 to a "closed" configuration shown in FIG. 3.

In the preferred embodiment shown in FIGS. 1–5 middle hinge 84 rotates so that first and second plates 80, 82 fold under the lens platform 14 when device 10 moves into its "closed" configuration (FIG. 13). In an alternate embodiment shown in FIGS. 17–18, middle hinge 84 rotates so that first and second plates 80, 82 fold away from under the lens platform 14 when device 10 moves into its "closed" configuration (FIG. 18). In either the configuration of FIGS. 1–5 or FIGS. 17–18, lens platform 14 moves from a position in its "closed" configuration located above and close to document platform 18 and document 16 to a position above and away from document platform 18 and document 16.

All hinges described herein including hinges 84, 86 and 88 as well as hinge 44, are preferably integral hinges, also known as living hinges" as shown in FIGS. 12a–12c. These hinges are manufactured according to well-known techniques such as those skilled in the art and are commonly published, for example, in data sheets by plastic manufacturers. It is well understood that a critical element in hinge design is the thickness of the hinge. Further, it may also be possible to improve hinge life by the addition of, for example, SBS rubber to the hinge. Although the preferred embodiment for the hinges shown herein are "living hinges", other types of hinges may be used as will occur to those skilled in the art.

It is desirable, although not essential, to have the hinges 84, 86 and 88 "lock" in an open configuration. This is accomplished by designing hinges 44, 84, 86 and 88 so that they are inherently in a fully open position such as that shown in FIG. 12a. In this way, when the collapsible positioning members 20 are in the closed or collapsed configurations, hinges 44, 84, 86 and 88 will be in the half-opened or closed configurations of FIGS. 12b–c. These configurations put stress on the hinges 44, 84, 86 and 88 and therefore are "higher energy" states than the open configuration of FIG. 12a. As a result, hinges 44, 84, 86 and 88 will tend to open to and remain in the configuration shown in FIG. 12a. Further, hinges 44, 84, 86 and 88 will not extend beyond their open 180° configuration shown in FIG. 12a.

It is the preferred embodiment to have both upper and lower hinges 86, 88 allow the lens platform 14 to move with respect to the document platform 18 by rotating around hinges 84, 88. However, in a variation of the embodiment shown in FIGS. 1–5, either upper hinge 86 or lower hinge 88.but not both may be rigid. In this way, lens platform 14 may still move with respect to document platform 18 by rotation of the non-rigid upper or lower hinge 86, 88 and middle hinge 84.

Further, in the preferred embodiment shown in FIGS. 1–5, first and second plates 80, 82 have the same length. It is within the scope of the invention that first and second plates 80, 82 may also have different lengths, if desired.

In addition, first and second plates 80, 82 are preferably substantially flat and planar. However, first and second plates 80, 82 may also have non-planar or non-flat shapes so long as they are capable of being attached to hinges 84, 86 and 88 as described herein. Examples of such non-planar or non-flat shapes include but are not limited to curved ribbon, twisted ribbon whether curved or flat, first and second plates 80, 82 with a substantial thickness including portions of first and second plates 80, 82 interleaving as the device 10 moves from an open configuration to a closed configuration and first and second plates 80, 82 having protrusions extending more or less away from first and second plates 80, 82.

In an alternate embodiment shown in FIGS. 19–21, collapsible positioning member 20 comprises a third and a fourth plate 90, 92. Third and fourth plates 90, 92 are each connected to lens platform 14 by upper hinge 86. Third and fourth plates 90, 92 are each connected to document platform 18 by a lower hinge 88. In this embodiment, there is no middle hinge 84. Upper and lower hinges 86, 88 allows third and fourth plates 90, 92 to rotate from an "open" configuration shown in FIG. 20 to a "closed" configuration shown in FIG. 21. In this embodiment, in the 12 "closed" configuration, lens platform 14 is located offset from document platform 18. As lens platform 14 moves to its "open" configuration, lens platform 14 moves to a position above document platform 18 so that lens 12 is located above document 16.

Referring to FIGS. 6 and 7, a preferred method of making the device 10 is shown. In FIG. 6, the device 10 is shown integrally molded at one time in a mold 94. The finished product shown in FIG. 7 will be substantially flat and in three parts, a lens 12, document cover 42 and main assembly 96. The main assembly 96 includes the lens platform 14, document platform 18 and collapsible positioning member 20 components described above. As can be seen in this embodiment, a lens platform mating surface 98 is formed along the outer edge 100 of lens platform 14. Additionally, an upper arm mating surface 102 is formed along the upper edge 104 of first plate 80. Lens platform mating surface 98 and upper arm mating surface 102 are adapted to be joined together. This can be done by permanently fastening lens platform mating surface 98 to upper arm mating surface 102 by means well understood in the art, including but not limited to, heat staking, ultrasonic welding or adhesives. In this embodiment, upper hinge 86 is formed where lens platform mating surface 98 meets lens platform 14 at 106.

As mentioned, the preferred embodiment has the main assembly 96 molded in one piece. Alternately, lens platform 14, document platform 18, and collapsible positioning member 20 can be formed separately and assembled. In this embodiment, lens platform 14, document platform 18, and collapsible positioning member 20 can be joined together by use of structure similar to lens platform mating surface 98, upper arm mating surface 102 and hinges 84, 86 and 88 as described above and as will be appropriate as will be clear to those skilled in the art.

Figure 22:
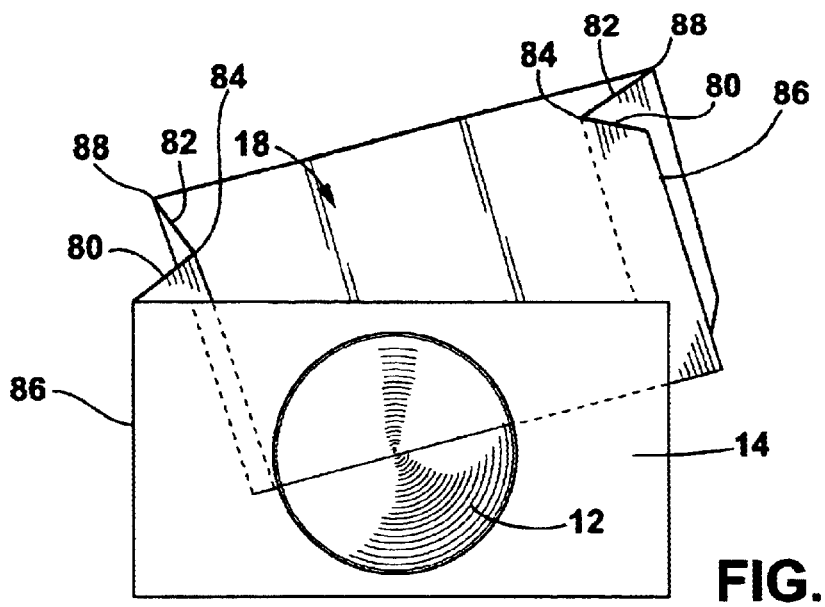
FIG. 22 is a perspective view of the embodiment of FIGS. 1–7 in a partially assembled configuration.

To assemble device 10, as shown in FIG. 22, lens 12 is affixed to lens platform 14. Where lens 14 is molded With lens platform 14, this affixation occurs as part of the molding process. Otherwise, this affixation can be done by means including, but not limited to, heat staking, ultrasonic welding or adhesives. In embodiments where document 16 is permanently affixed to document cover 18, document cover 16 is permanently affixed to document cover 18 as described above. In embodiments where document 16 is removably affixed to document cover 18, document 16 may be removably affixed to document cover 18 as described above at this time or later as desired. Document cover 42 may be brought into contact with document cover 18 as described above at this time as described above or may be affixed later as desired.

Lens platform mating surface 98 is brought into contact with upper arm mating surface 102 and joined as described above. The resulting structure has the form shown in FIGS. 1–5.

Figure 23:
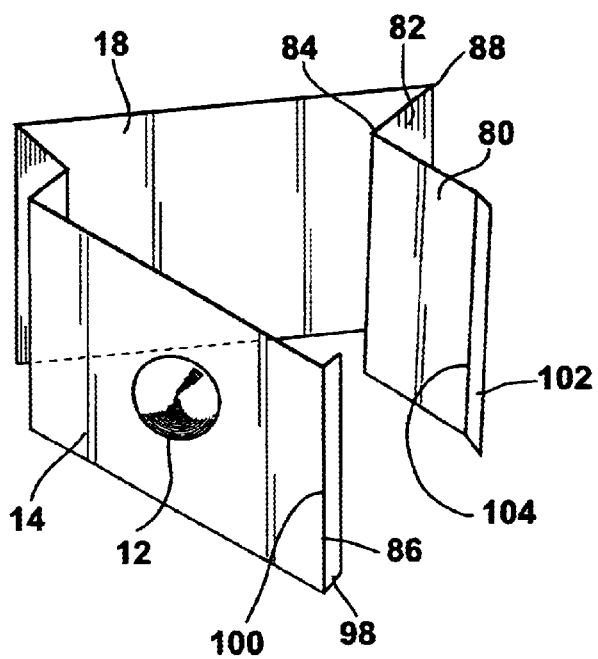
FIG. 23 is perspective view of an alternate embodiment of the invention in a partially assembled configuration.

In a variant embodiment to that described above in connection with FIGS. 9 and 10, lens platform mating surface 98 and upper arm mating surface 102 may be removably joined together as shown in FIG. 23. In addition, hinges 84, 86 and 88 in this embodiment have increased flexibility over that required in the previous embodiment for a purpose to be explained hereafter.

Figure 24:
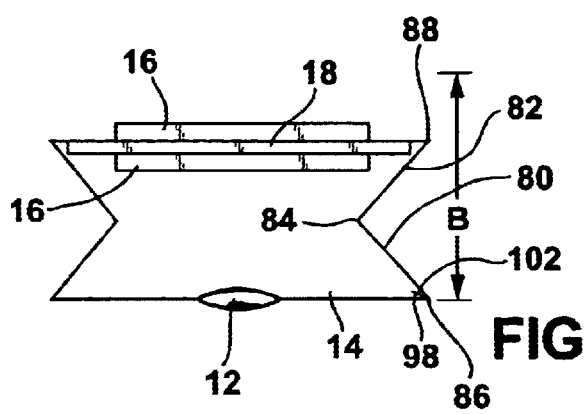
FIG. 24 is a side view of the embodiment of FIG. 23.

The removably connection between lens platform mating surface 98 and upper arm mating surface 102 can be accomplished by means of post 56 and hole 58 connection as described hereafter or by other means well understood in the art that provide a removable connection between lens platform mating surface 98 and upper arm mating surface 102. Because lens platform mating surface 98 and upper arm mating surface 102 are removably connected, as described above, lens platform 14 may be moved from its position above first surface 38 of document platform 18 to a position above the second surface 40 of document platform 18 by rotating the entire lens platform 14 and collapsible positioning member 20 around the lower hinge 84 opposite the lens platform mating surface 98 and upper arm mating surface 102 (FIG. 24). In this embodiment, lens platform mating surface 98 is again brought into contact with and upper arm mating surface 102, only this time, this contact is done on the side of the second surface 40 of document platform 18. In this embodiment, an additional document 16 may be affixed to the second surface 32 of document platform 18 by any of the means described above.

In this embodiment, as lens platform 14 is moved to its new position above second surface 40, hinges 84, 86 and 88 are now flexing in an opposite direction from when lens platform 14 is above first surface 38. For this reason, hinges 84, 86 and 88 must be sufficiently flexible to allow the lens platform 14 and collapsible positioning member 20 to be rotated into this new position. Further, lens 12 is now oriented toward document 16 located on second surface 40 of document platform 18 so that the second focal length "B" of lens 12 is directed toward this second document. As a result, the second focal length "B" of lens 12 may be either the same or different as that of the first focal length depending on the magnification desired of this second document 16.

Figure 25:
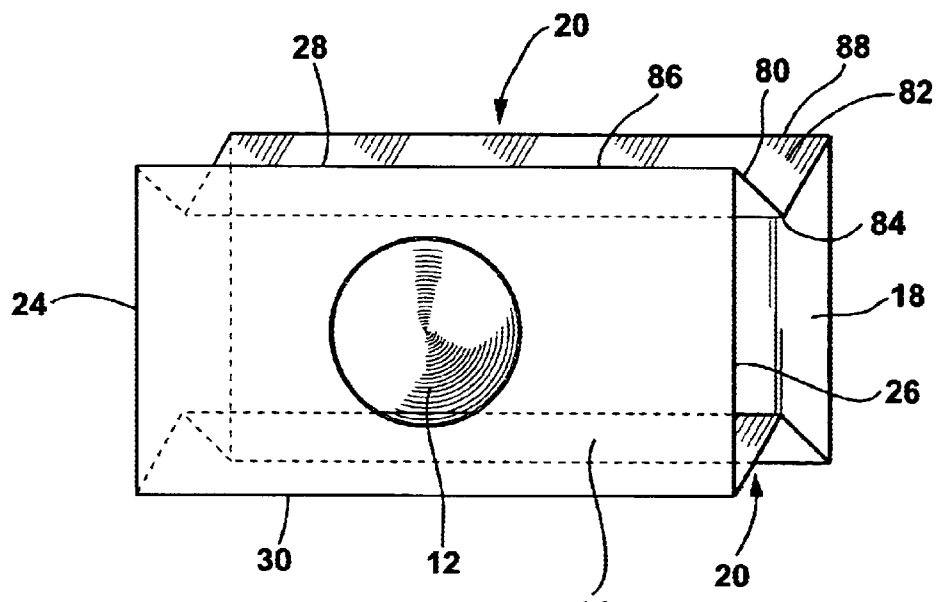
FIG. 25 is a perspective view of an alternate embodiment of the invention in a partially open or extended configuration.
Figure 26:
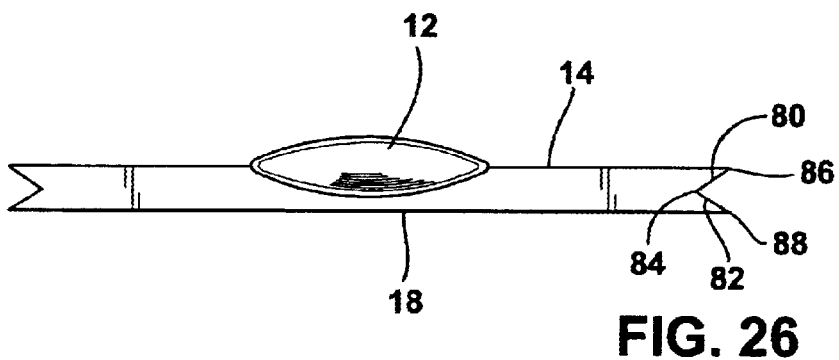
FIG. 26 is a side view of the embodiment of the invention of FIG. 25 in a closed or collapsed configuration.

FIGS. 25 and 26 show an alternate embodiment of the invention shown in FIGS. 1–5. In this embodiment, the lens 12, lens platform 14, document 16 and document platform 18 are as described above. However, the collapsible positioning members 20 in this embodiment are located along the third and fourth sides 28, 30 of the lens platform 14 and document platform 18 instead of along the first and second sides 24, 26. In all other ways, the device 10 of this embodiment is the same as is described above in connection with the preferred embodiment.

Figure 27:
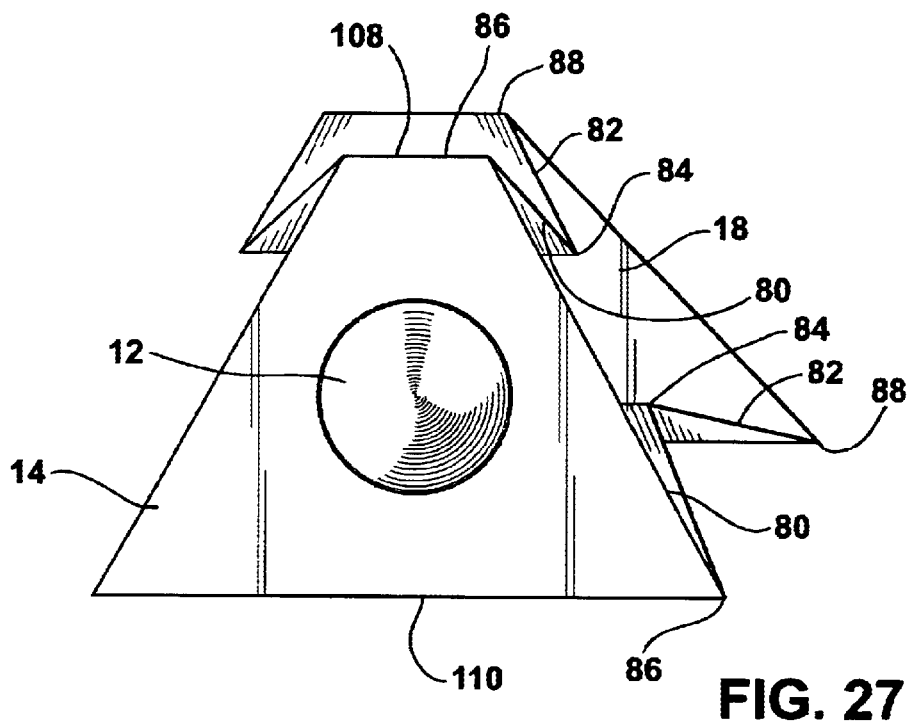
FIG. 27 is a perspective view of the truncated triangle alternate embodiment of the invention in a partially open or extended configuration.
Figure 28:
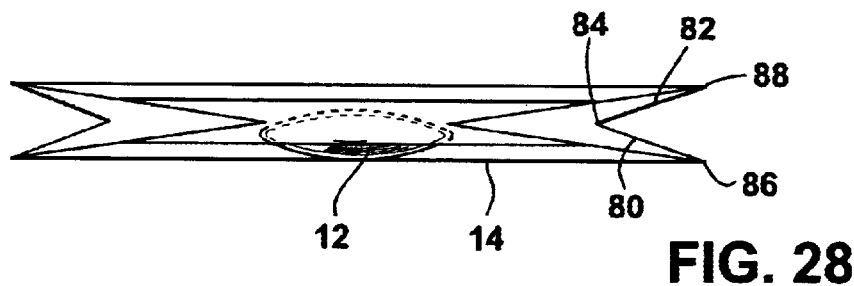
FIG. 28 is a side view of the invention of FIG. 27 in a closed or collapsed configuration.

In another embodiment shown in FIGS. 27–28, lens platform 14 and document platform 18 are both substantially triangular having a truncated apex 108 and a base side 110. In this embodiment, lens 12 and document 16 are both as described above so long as both are contained within the respective dimensions of lens platform 14 and document platform 18. In this embodiment, collapsible positioning member 20 may take any of the forms described above. However, the first and second collapsing members 76, 78 are moved to the truncated apex 108 and base side 110, respectively, of the triangular lens platform 14 and document platform 18. In all other ways, first and second collapsing members 76, 78 are identical to the embodiments described above.

Figure 29:
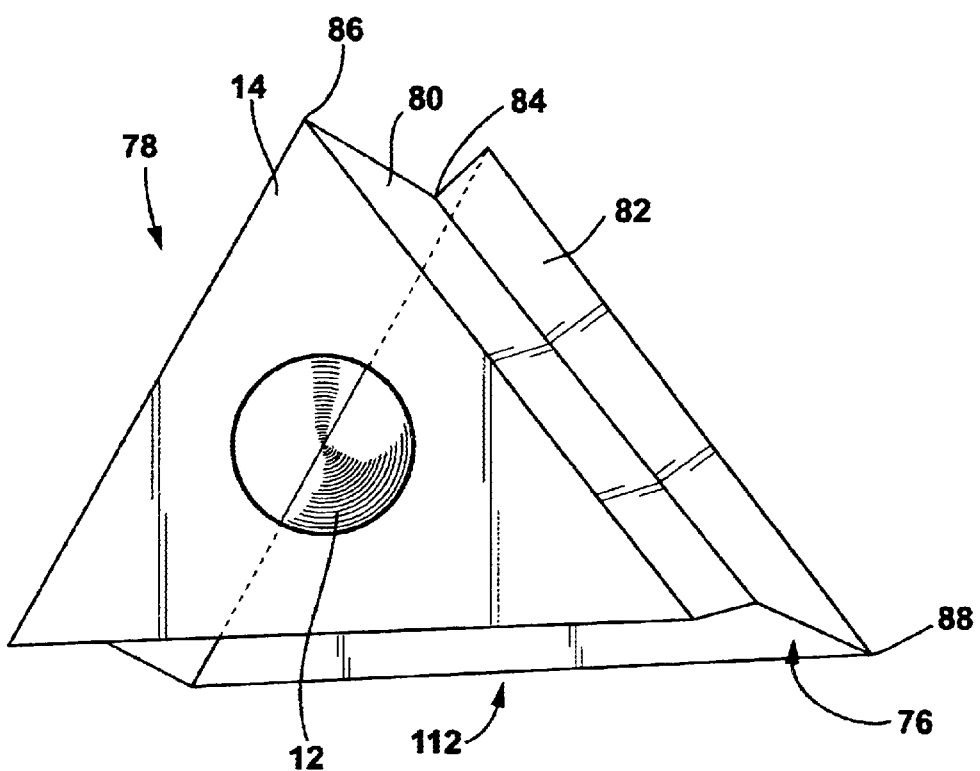
FIG. 29 is a perspective view of an alternate embodiment of the truncated triangle alternate embodiment of the invention in a partially open or extended configuration.
Figure 30:
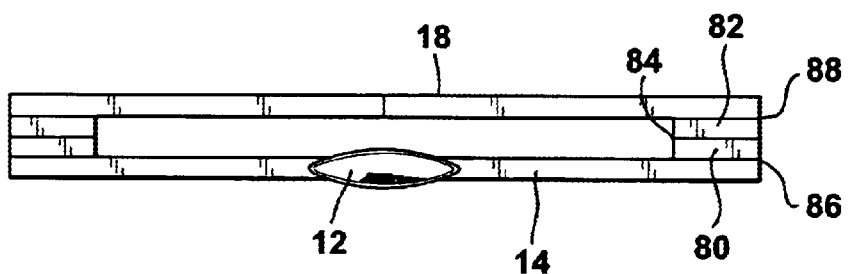
FIG. 30 is a side view of the embodiment of the invention of FIG. 29 in a closed or collapsed configuration.

FIGS. 29–30 show a variant of the triangular embodiment shown in FIGS. 27–28. In this embodiment, both lens platform 14 and document platform 18 are substantially triangular. Each side of the triangular lens platform 14 and document platform 18 has a middle, upper and lower hinge 84, 86 and 88, respectively.

In this embodiment, collapsible positioning member 20 comprises a first, second and third collapsing member 76, 78, 112, respectively. First, second and third collapsing member 76, 78 and 112 each have a first plate 80 and a second plate 82. Each first plate 80 and second plate 82 is connected by middle hinge 84. First plate 80 is connected to lens platform 14 by an upper hinge 86. Second plate 82 is connected to document platform 18 by a lower hinge 88. Middle, upper and lower hinges 84, 86 and 88 allows first and second plates 80, 82 to rotate from an "open" configuration to a "closed" configuration shown in FIG. 30.

Figure 31:
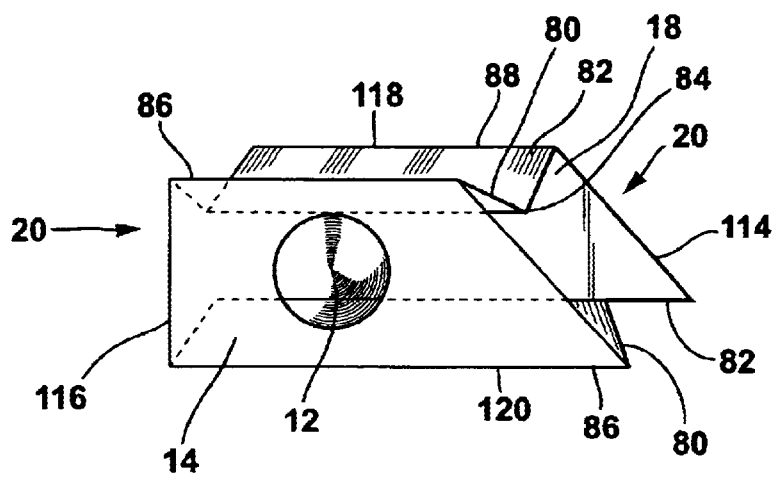
FIG. 31 is a perspective view of the trapezoidal alternate embodiment of the invention in a partially open or extended configuration.
Figure 32:
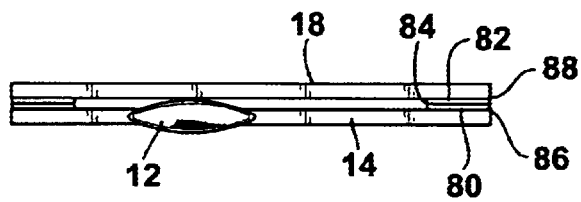
FIG. 32 is a side view of the embodiment of the invention of FIG. 31 in a closed or collapsed configuration.

In another embodiment shown in FIGS. 31–32, lens platform 14 and document platform 18 are both substantially trapezoidal having an elongated side 114, an opposite side 116, a short side 118 and a long side 120. In this embodiment, lens 12 and document 16 are both as described above so long as both are contained within the respective dimensions of lens platform 14 and document platform 18. In this embodiment, collapsible positioning member 20 may take any of the forms described above. However, the first and second collapsing members 76, 78 may be attached to either short and long sides 118, 120, respectively, or elongated and opposite sides 122, 124, respectively. In all other ways, first and second collapsing members 76, 78 are identical to the embodiments described above.

Figure 33:
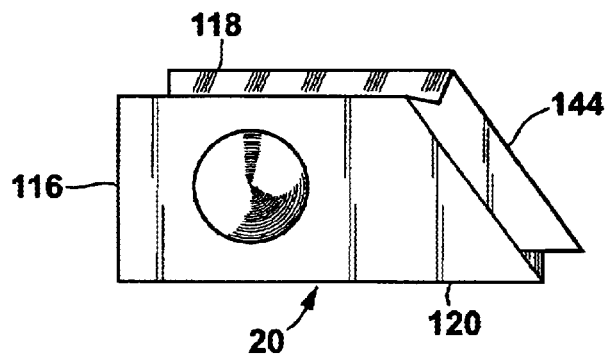
FIG. 33 is a perspective view of an alternate embodiment of the trapezoidal alternate embodiment of the invention in a partially open or extended configuration.
Figure 34:
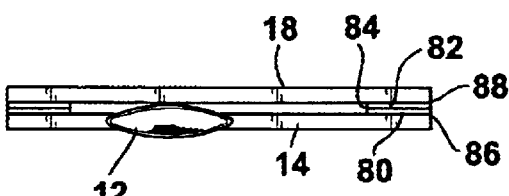
FIG. 34 is a side view of the embodiment of the invention of FIG. 33 in a closed or collapsed configuration.

In a further embodiment shown in FIGS. 33–34, first and second collapsing members 76, 78 may be attached to both short and long sides 118, 120 and elongated and opposite sides 122, 124. In this embodiment, it may be necessary to remove part of the edges of first and second plates 80, 82 so that respective first and second plates 80, 82 do not contact and interfere with each other as device 10 moves from its "open" configuration to its "closed" configuration. In all other ways, first and second collapsing members 76, 78 are identical to the embodiments described above.

Figure 35:
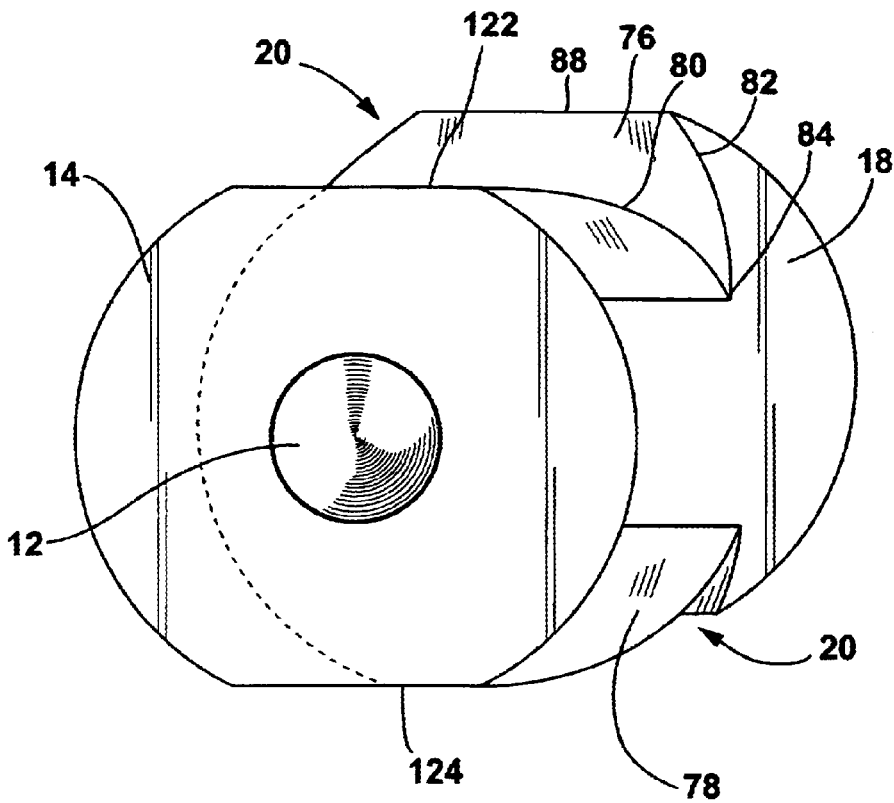
FIG. 35 is a perspective view of an elliptical alternate embodiment of the invention in a partially open configuration.
Figure 36:
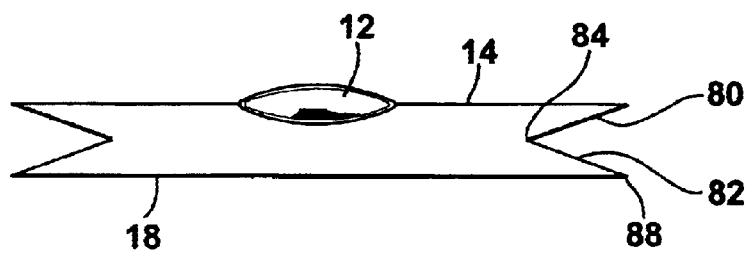
FIG. 36 is a perspective view of an elliptical embodiment of the invention in a partially closed configuration.

In a further embodiment, shown in FIGS. 35–36, both lens platform 14 and document platform 18 have an elliptical shape. In addition, lens platform 14 and document platform 18 also have a first and second side 122, 124. First and second side 122, 124 may be located at roughly opposite positions around the outer edge of lens platform 14 and document platform 18. In this embodiment, lens 12 and document 16 are both as described above so long as both are contained within the respective dimensions of lens platform 14 and document platform 18. In this embodiment, collapsible positioning member 20 may take any of the forms described above. However, the first and second collapsing members 76, 78 are attached to first and second sides 122, 124 by upper and lower hinges 86, 88. In all other ways, first and second collapsing members 76, 78 are identical to the embodiments described above.

Figure 37:
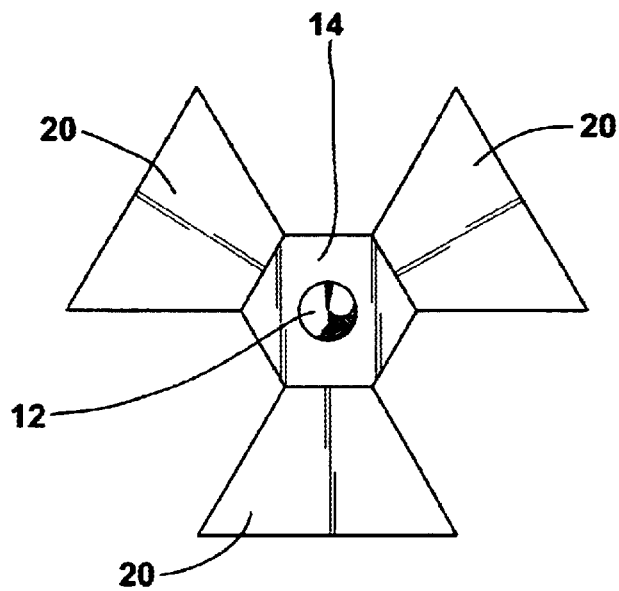
FIG. 37 is a top view of an alternate embodiment of the invention.
Figure 38:
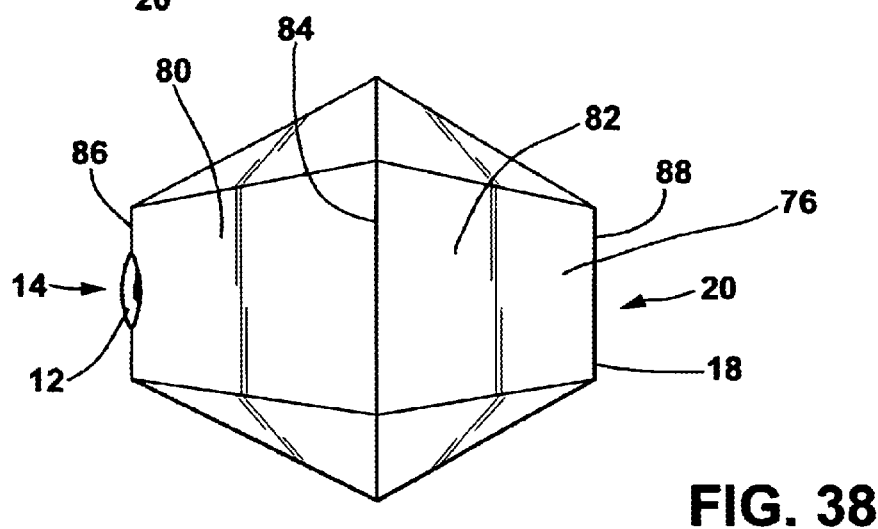
FIG. 38 is a side view of the embodiment of FIG. 37 in an open configuration.
Figure 39:
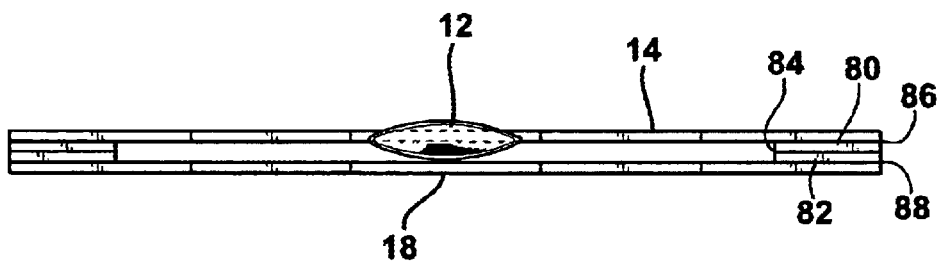
FIG. 39 is a side view of the embodiment of FIG. 37 in a closed configuration.

In yet another embodiment, shown in FIGS. 37–39, both lens platform 14 and document platform 18 have a "flower-like" shape. In this configuration, lens platform 14 and document platform 18 have at least two collapsible positioning members 20. In this embodiment, lens 12 and document 16 are both as described above and collapsible positioning member 20 may take any of the forms described above. Again, the first and second collapsing members 76, 78 are attached to the lens platform 14 and document platform 18 by upper and lower hinges 86, 88. In all other ways, first and second collapsing members 76, 78 are identical to the embodiments described above. There may be a collapsible positioning member 20 such as first collapsing member 76 at many points around the periphery of lens platform 14 and document platform 18.

Figure 40:
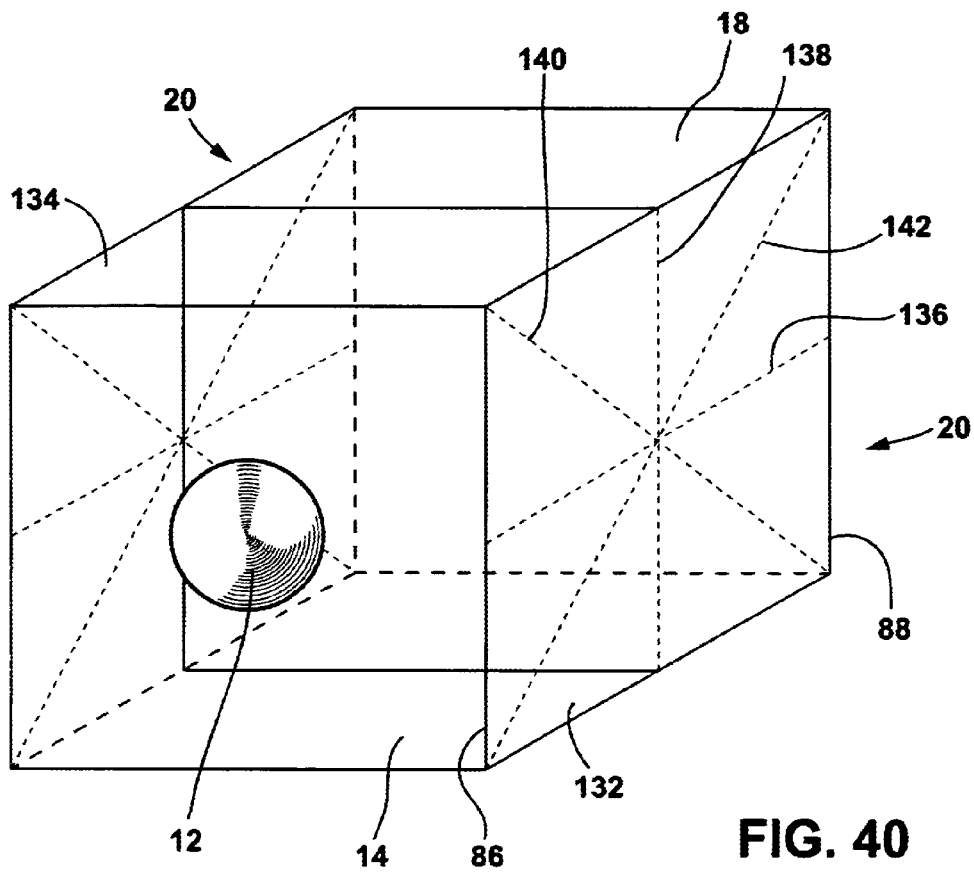
FIG. 40 is a perspective view of an alternate embodiment of the invention.
Figure 41:
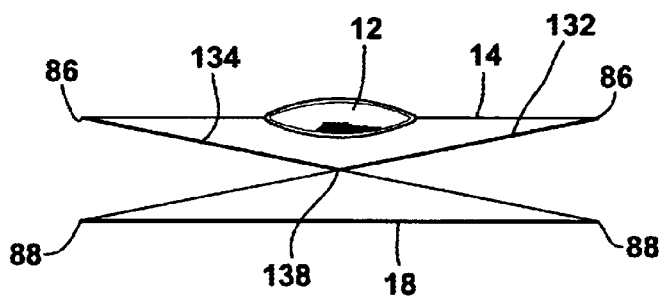
FIG. 41 is a side view of the embodiment of FIG. 40 in a closed configuration.

A further alternate embodiment of the invention is shown in FIGS. 40–41. This embodiment takes advantage of origami principles to make, primarily, the collapsible positioning member 20. In this embodiment, the collapsible positioning member 20 is formed of two single sheets 132, 134 of a rugged yet flexible material. In the preferred version of this embodiment, sheets 132, 134 are made of a lightweight durable plastic. Examples of such plastic include, but are not limited to, K-resin 38 or K-resin 01. Sheets 132, 134 are affixed to lens platform 14 and document platform 18 by upper and lower hinges 86, 88, respectively, as described above. Further, lens platform 14 and document platform 18 are as described above.

Sheets 132, 134 have a series of folds as follows, a middle fold 136, a vertical fold 138 and a pair of diagonal folds 140, 142. Folds 136, 138, 140 and 142 may either be all inwardly folding or outwardly folding as desired. In fact, folds 136, 138, 140 and 142 may be all inwardly folding on sheet 132 and outwardly folding on sheet 134, or the reverse, if desired. Folds 136, 138, 140 and 142 form "virtual" hinges along sheets 132, 134 that allow lens platform 14 to be moved above and away from document platform 18 as sheets 132, 134 fold along folds 136, 138, 140 and 142. The material thickness of sheets 132, 134 should be adjusted to provide "locking" in the open configuration when sheets 132, 134 are substantially planar.

As mentioned above, in certain embodiments of the invention, it is intended that the device 10 be substantially flat in its collapsed configuration. This is accomplished by the cooperation between the collapsible positioning members 20, the lens 12 and lens platform 14 and the document 16 and the document holder 18, as described above, to collapse to the substantially flat configuration when closed or collapsed. This "flatness" is further helped by making the collapsible positioning members 20, the lens 12 and lens platform 14 and the document 16 and the document holder 18 as thin as possible while still having these elements retains sufficient strength to perform their functions as described above.

In the preferred embodiment, each piece of the device 10 preferably has a thickness of about 0.045–0.050". As a result, in the embodiment shown in FIGS. 1–5 in the collapsed configuration shown in FIG. 3, the device will have a thickness of about four times the 0.045–0.050" or about 0.180–0.200". Likewise, in the embodiment shown in FIGS. 19–21 in the collapsed configuration shown in FIG. 21, the device will have a thickness of about two times the 0.045–0.050" or about 0.090–0.100". Of course, where lens 12 is substantially thicker than 0.045–0.050" or where physical restraint members 54, mirror 70 or light producing device 72 is present, device 10 will have to be thicker to accommodate for these elements.

Further, although the preferred thickness for each piece of the device 10 is about 0.045–0.050", these dimensions are given only to be illustrative of the current best mode and are not intended to be limiting. It is clear that all or any of the elements of device 10 may be thicker or thinner than 0.045–0.050" as desired or as dictated by the requirements of the materials used to produce the device 10, the requirements of hinges 44, 84, 86 and 88 or to meet molding requirements and still perform as described above as part of the invention.

In any of the disclosed embodiments, because device 10 is substantially flat when collapsed and has dimensions similar to a credit card, device 10 may be easily carried in much the same way as a credit card would be carried. For example, device 10 may be carried in the user's pocket or in the user's wallet.

Another benefit of the invention as disclosed is that there is a certain amount of flexibility in the orientation of lens 12 with respect to document 16. By flexibility, it is meant that lens 12 may move "back and forth" over document 16 thus allowing the user to "scan" different aspects of document 16. This ability to move "back and forth" is primarily due to the fact that lens platform 18 is pivotally connected to document platform 18 through hinges 84, 86 and 88. As a result, lens platform 18 may be moved side to side a bit without significantly affecting the distance of lens 12 from the document 16. This allows the user to view a larger document 16 than would otherwise be possible if lens 12 were rigidly positioned above document 16.

Figure 42:
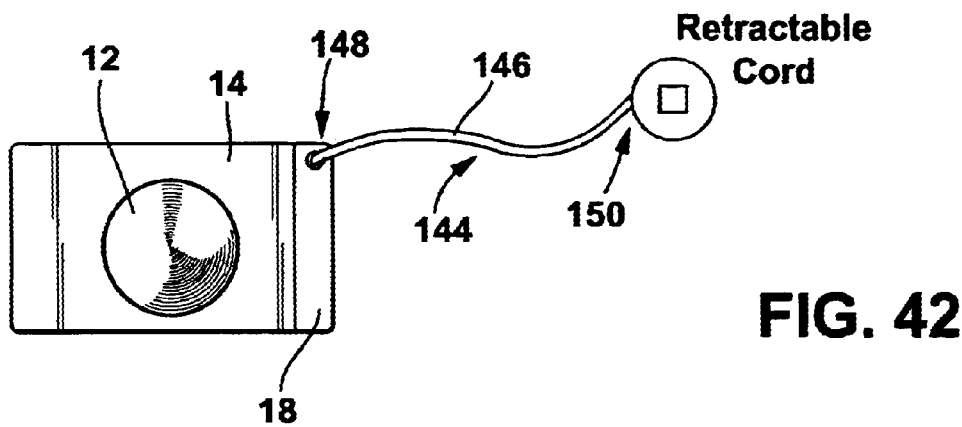
FIG. 42 is a perspective view of an alternate embodiment of the invention.

In an alternate embodiment shown in FIG. 42, device 10 includes a user connecting means 144. User connecting means 144 connects the device 10 to the user "U". User connecting means 144 is attached to outer edges 22 of document platform 18. In a preferred embodiment, user connecting means 144 is a line 146 having a first end 148 and a second end 150. Line 146 is connected to document platform 18 at first end 148 of line 146 and connected to the user "U" at second end 150 of line 146. Line 146 may take the form of a pigtail type wire such as a telephone cord, a retractable cord or a simple flexible cord, to name but a few possible embodiments as will be clear to those skilled in the art.

Figure 43:
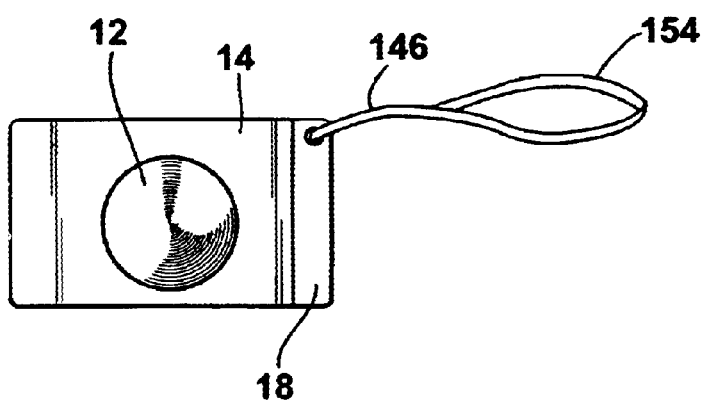
FIG. 43 is a perspective view of a particular embodiment of the attachment means of the invention of FIG. 42.
Figure 44:
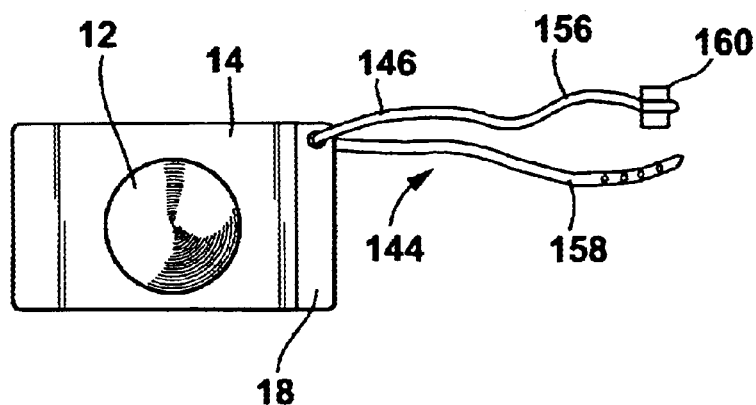
FIG. 44 is a perspective view of a particular embodiment of the attachment means of the invention of FIG. 42.
Figure 45:
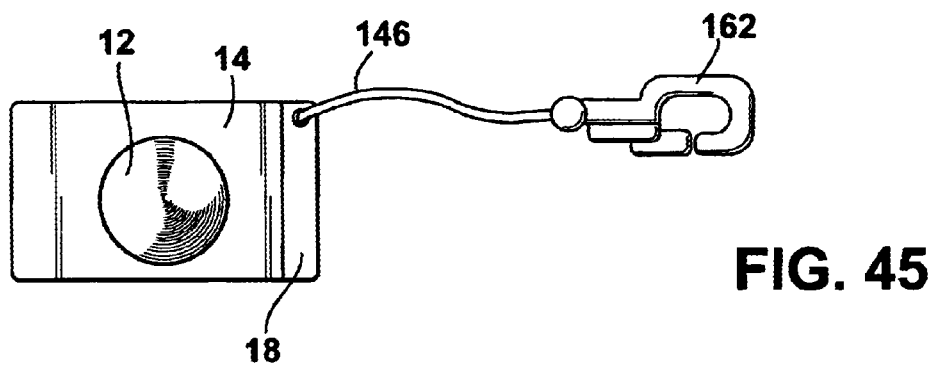
FIG. 45 is a perspective view of a particular embodiment of the attachment means of the invention of FIG. 42.

As mentioned, it is preferable to attach line 146 to the user. To do so, an 11 attachment means 152 is connected to the user on the second end 150. As shown in FIG. 43, Attachment means 152 may take the form of a strap 154, such as that commonly used on ski poles, that is placed around a user's wrist. Alternately, as shown in FIG. 44, user connecting means 144 may take the form of a first and second band 156, 158 connected by a locking clasp 160 in the same fashion as a wristwatch watchband. In another embodiment, as shown in FIG. 45, user connecting means 44 may take the form of a spring loaded catch 162 attached to the line 146.

Figure 46:
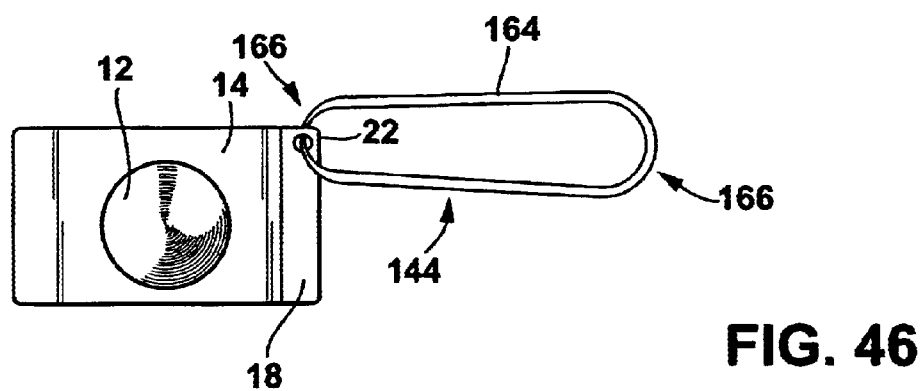
FIG. 46 is a perspective view of a particular embodiment of the attachment means of the invention of FIG. 42.
Figure 47:
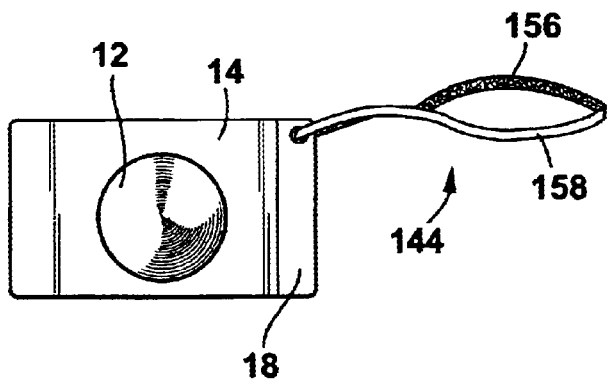
FIG. 47 is a perspective view of a particular embodiment of the attachment means of the invention of FIG. 42.

Further, as shown in FIG. 46, user connecting means 144 may take the form of an elastic band 164 having opposed ends 166. Each opposed end 166 is attached to respective opposed outer edges 22 of document platform 18. Finally, as shown in FIG. 47, first and second band 156, 158 may be connected by hook and loop fasteners such as those sold under the trademark Velcro® attached to first or second bands 156, 158, respectively, or vice versa. Although several embodiments of user connecting means 144 have been disclosed, any other means of connected objects to wrists fall within the scope of the invention as will be clear to those skilled in the art.

The invention has been described herein in connection with specific embodiments and dimensions. It is to be understood, however, that the description given herein has been given for the purpose of explaining and illustrating the invention and are not intended to limit the scope of the invention. It is to be further understood that changes and modifications to the descriptions given herein will occur to those skilled in the art. Therefore, the scope of the invention should be limited only by the scope of the following claims.

I claim:

1. A device for creating a magnified image of a document comprising:
    a lens having an outer edge, the lens capable of producing a virtual image;
    a lens platform for positioning the lens, the lens platform having an outer edge;
    a document platform having an outer periphery and a first and second side, the first side capable of contacting the document;
    a collapsible positioning member connecting the lens platform to the document platform for positioning the lens platform a distance from the document to produce a virtual image of the document; and
    a mirror attached to the second surface of the document platform.

2. A device for creating a magnified image of a document comprising:
    a lens having an outer edge, the lens capable of producing a virtual image;
    a lens platform for positioning the lens, the lens platform having an outer edge;
    a document platform having an outer periphery and a first and second side, the first side capable of contacting the document;
    a collapsible positioning member connecting the lens platform to the document platform for positioning the lens platform a distance from the document to produce a virtual image of the document wherein the collapsible positioning member is open to allow ambient light to pass around the collapsible positioning member and impinge on the document; and
    a document cover to hold a document in close association with the document platform, the document cover having an outer periphery wherein the document cover is removably attached to the document platform.

3. The device of claim 2 wherein the lens is chosen from the group consisting of a convex lens, a bi-convex lens, an aspheric lens and a Fresnel lens.

4. The device of claim 2 wherein the collapsible positioning member moves the lens platform near the document platform to produce a substantially flat device.

5. The device of claim 2 wherein the lens platform and document platform is roughly rectangular.

6. The device of claim 5 wherein the lens platform and document platform have dimensions between about 3.5 inches by about 5 inches.

7. The device of claim 6 wherein the lens platform and document platform have dimensions between about 3 inches by about 3.5 inches.

8. The device of claim 7 wherein the lens platform and document platform have dimensions between about 2 inches by about 3.5 inches.

9. The device of claim 2 wherein the lens platform has a shape chosen from the group consisting of rectangular, square, circular, oval, freeform, octagonal or hexagonal.

10. The device of claim 2 wherein the outer edge of the lens has a shape chosen from the group consisting of circular, rectangular, square, hexagonal, octagonal, pentagonal, oval, freeform or a specific shape such as the outline of a state or country.

11. The device of claim 2 wherein the document platform has a shape chosen from the group consisting of rectangular, square, circular, oval, freeform, octagonal or hexagonal.

12. The device of claim 2 further comprising a user connecting means for connecting either the lens platform, document platform or collapsible positioning member to a user.

13. The device of claim 2 wherein the document cover is affixed to the document platform by a hinge.

14. The device of claim 2 wherein the document cover is pivotally connected to the document platform by a pin that allows the document cover to be rotated away from and toward the document platform to allow a document to be placed on the document platform.

15. The device of claim 14 wherein the document cover has a mating post projecting from the document cover toward the document platform and the document platform has a hole dimensioned to receive the mating post so that the document cover is held in close association to the document platform.

16. The device of claim 14 wherein the document cover has a first magnet attached to it and the document cover has a second magnet attached to it wherein the opposite poles of the first and second magnets are directed toward each other so that the document cover is held in close association to the document platform when the document cover is brought next to the document platform.

17. The device of claim 2 wherein the document cover has a first magnet attached to it and the document cover has a second magnet attached to it wherein the opposite poles of the first and second magnets arc directed toward each other so that the document cover is held in close association to the document platform when the document cover is brought next to the document platform.

18. The device of claim 2 wherein the document cover has a mating post projecting from the document cover toward the document platform and the document platform has a hole dimensioned to receive the mating post so that the document cover is held in close association to the document platform.

19. A device for creating a magnified image of a document comprising:
   a lens having an outer edge, the lens capable of producing a virtual image;
   a lens platform for positioning the lens, the lens platform having an outer edge;
   a document platform having an outer periphery-and a first and second side, the first side capable of contacting the document;
   a collapsible positioning member connecting the lens platform to the document platform for positioning the lens platform a distance from the document to produce a virtual image of the document; and
   a document cover to hold a document in close association with the document platform, the document cover having an outer periphery wherein the document cover is permanently affixed to the document platform and wherein the document platform has at least one recess along its outer periphery, wherein the document cover has a corresponding ridge formed along the outer periphery of the document cover and wherein the ridge mates with the recess to hold the document cover in close association with the document platform.

20. The device of claim 19 further comprising a user connecting means for connecting either the lens platform, document platform or collapsible positioning member to a user.

21. A device for creating a magnified image of a document comprising:
   a lens having an outer edge, the lens capable of producing a virtual image;
   a lens platform for positioning the lens, the lens platform having an outer edge;
   a document platform having an outer periphery and a first and second side, the first side capable of contacting the document;
   a collapsible positioning member connecting the lens platform to the document platform for positioning the lens platform a distance from the document to produce a virtual image of the document; and
   a document cover to hold a document in close association with the document platform, the document cover having an outer periphery wherein the document cover is permanently affixed to the document platform and wherein the document platform has at least one physical restraint member located on the document platform and dimensioned to wrap around and constrain an outer edge of a document placed on the document platform.

22. The device of claim 21 further comprising a user connecting means for connecting either the lens platform, document platform or collapsible positioning member to a user.

23. A device for creating a magnified image of a document comprising:
   a lens having an outer edge, the lens capable of producing a virtual image;
   a lens platform for positioning the lens, the lens platform having an outer edge;
   a document platform having an outer periphery and a first and second side, the first side capable of contacting the document;
   a collapsible positioning member connecting the lens platform to the document platform for positioning the lens platform a distance from the document to produce a virtual image of the document; and
   a document cover to hold a document in close association with the document platform, the document cover having an outer periphery wherein the document cover is removably attached to the document platform.

24. The device of claim 23 wherein the document cover has a mating post projecting from the document cover toward the document platform and the document platform has a hole dimensioned to receive the mating post so that the document cover is held in close association to the document platform.

25. The device of claim 23 wherein the document cover has a first magnet attached to it and the document cover has a second magnet attached to it wherein the opposite poles of the first and second magnets are directed toward each other so that the document cover is held in close association to the document platform when the document cover is brought next to the document platform.

26. The device of claim 23 wherein the document cover is pivotally connected to the document platform by a pin that allows the document cover to be rotated away from and toward the document platform to allow a document to be placed on the document platform.

27. The device of claim 26 wherein the document cover has a mating post projecting from the document cover toward the document platform and the document platform has a hole dimensioned to receive the mating post so that the document cover is held in close association to the document platform.

28. The device of claim 26 wherein the document cover has a first magnet attached to it and the document cover has a second magnet attached to it wherein the opposite poles of the first and second magnets are directed toward each other so that the document cover is held in close association to the document platform when the document cover is brought next to the document platform.

29. The device of claim 23 further comprising a user connecting means for connecting either the lens platform, document platform or collapsible positioning member to a user.

30. A device for creating a magnified image of a document comprising:
- a lens having an outer edge, the lens capable of producing a virtual image;
- a lens platform for positioning the lens, the lens platform having an outer edge;
- a document platform having an outer periphery and a first and second side, the first side capable of contacting the document; and
- a collapsible positioning member connecting the lens platform to the document platform for positioning the lens platform a distance from the document to produce a virtual image of the document, wherein the collapsible positioning member comprises a first and a second collapsing member and wherein the first and second collapsing member each have a rigid first plate, a rigid second plate and a middle hinge that connects each first plate to a corresponding second plate, at least one first plate having an upper edge wherein the collapsible positioning member is open to allow ambient light to pass around the collapsible positioning member and impinge on the document and
- a lens platform mating surface formed along the outer edge of the lens platform and an upper arm mating surface formed along the upper edge of the first plate.

31. The device of claim 30 wherein the first plate is connected to the lens platform by an upper hinge.

32. The device of claim 30 wherein the second plate is connected to the document platform by a lower hinge.

33. The device of claim 30 wherein the middle hinge rotates so that the first and second plates fold under the lens platform when the device moves into a closed configuration.

34. The device of claim 30 wherein the middle hinge rotates so that the first and second plates fold away from under the lens platform when the device moves into a closed configuration.

35. The device of claim 30 further comprising a user connecting means for connecting either the lens platform, document platform or collapsible positioning member to a user.

36. The device of claim 30 further comprising means for permanently joining the lens platform mating surface to the upper arm mating surface.

37. The device of claim 30 further comprising means for removably joining the lens platform mating surface to the upper arm mating surface.

38. The device of claim 37 wherein the means for removably joining is a post and hole connection.

39. The device of claim 30 further comprising a third collapsing member wherein the third collapsing member comprises a third plate, a fourth plate and a middle hinge that connects the third plate to the fourth plate.

40. The device of claim 39 wherein the third plate is connected to the lens platform by an upper hinge.

41. The device of claim 39 wherein the fourth plate is connected to the document platform by a lower hinge.

42. The device of claim 30 wherein the lens is chosen from the group consisting of a convex lens, a bi-convex lens, an aspheric lens and a Fresnel lens.

43. A device for creating a magnified image of a document comprising:
- a lens having an outer edge, the lens capable of producing a virtual image;
- a lens platform for positioning the lens, the lens platform having an outer edge;
- a document platform having an outer periphery and a first and second side, the first side capable of contacting the document;
- a collapsible positioning member connecting the lens platform to the document platform for positioning the lens platform a distance from the document to produce a virtual image of the document wherein the collapsible positioning member is formed of at least one flexible sheet affixed to the lens platform and the document platform by upper and lower hinges, respectively wherein the sheet has a middle fold a vertical fold, and a pair of diagonal folds.

44. A device for creating a magnified image of a document comprising:
- a lens having an outer edge, the lens capable of producing a virtual image;
- a lens platform for positioning the lens, the lens platform having an outer edge;
- a document platform having an outer periphery and a first and second side, the first side capable of contacting the document;
- a collapsible positioning member connecting the lens platform to the document platform for positioning the lens platform a distance from the document to produce a virtual image of the document, wherein the collapsible positioning member comprises a first and a second collapsing member and wherein the first and second collapsing member each have a rigid first plate, a rigid second plate and a middle hinge that connects each first plate to a corresponding second plate, at least one first plate having an upper edge, and
- a lens platform mating surface formed along the outer edge of the lens platform and an upper arm mating surface formed along the upper edge of the first plate.

45. The device of claim 44 wherein the first plate is connected to the lens platform by an upper hinge.

46. The device of claim 44 wherein the second plate is connected to the document platform by a lower hinge.

47. The device of claim 44 wherein the middle hinge rotates so that the first and second plates fold under the lens platform when the device moves into a closed configuration.

48. The device of claim 44 wherein the middle hinge rotates so that the first and second plates fold away from under the lens platform when the device moves into a closed configuration.

49. The device of claim 44 further comprising a lens platform mating surface formed along the outer edge of the lens platform and an upper arm mating surface formed along the upper edge of the first plate.

50. The device of claim 49 further comprising means for permanently joining the lens platform mating surface to the upper arm mating surface.

51. The device of claim 49 further comprising means for removably joining the lens platform mating surface to the upper arm mating surface.

52. The device of claim 51 wherein the means for removably joining is a post and hole connection.

53. The device of claim 44 further comprising a third collapsing member wherein the third collapsing member comprises a third plate, a fourth plate and a middle hinge that connects the third plate to the fourth plate.

54. The device of claim 53 wherein the third plate is connected to the lens platform by an upper hinge.

55. The device of claim 53 wherein the fourth plate is connected to the document platform by a lower hinge.

56. The device of claim 44 further comprising a user connecting means for connecting either the lens platform, document platform or collapsible positioning member to a user.

57. A device for creating a magnified image of a document comprising:

- a lens having an outer edge, the lens capable of producing a virtual image;
- a lens platform for positioning the lens, the lens platform having an outer edge;
- a document platform having an outer periphery and a first and second side, the first side capable of contacting the document;
- a collapsible positioning member connecting the lens platform to the document platform for positioning the lens platform a distance from the document to produce a virtual image of the document wherein the collapsible positioning member is formed of at least one flexible sheet affixed to the lens platform and the document platform by upper and lower hinges, respectively and wherein the sheet has a middle fold, a vertical fold and a pair of diagonal folds.

58. The device of claim 57 further comprising a user connecting means for connecting either the lens platform, document platform or collapsible positioning member to a user.

59. A device for creating a magnified image of a document comprising:

- a lens having an outer edge, the lens capable of producing a virtual image;
- a lens platform for positioning the lens, the lens platform having an outer edge;
- a document platform having an outer periphery and a first and second side, the first side capable of contacting the document;
- a collapsible positioning member connecting the lens platform to the document platform for positioning the lens platform a distance from the document to produce a virtual image of the document wherein the collapsible positioning member is open to allow ambient light to pass around the collapsible positioning member and impinge on the document; and
- a document cover to hold a document in close association with the document platform, the document cover having an outer periphery wherein the document cover is permanently affixed to the document platform and wherein the document platform has at least one recess along its outer periphery, wherein the document cover has a corresponding ridge formed along the outer periphery of the document cover and wherein the ridge mates with the recess to hold the document cover in close association with the document platform.

60. The device of claim 59 wherein the lens is chosen from the group consisting of a convex lens, a bi-convex lens, an aspheric lens and a Fresnel lens.

61. The device of claim 59 wherein the collapsible positioning member moves the lens platform near the document platform to produce a substantially flat device.

62. The device of claim 59 wherein the lens platform and document platform is roughly rectangular.

63. The device of claim 62 wherein the lens platform and document platform have dimensions between about 3.5 inches by about 5 inches.

64. The device of claim 63 wherein the lens platform and document platform have dimensions between about 3 inches by about 3.5 inches.

65. The device of claim 64 wherein the lens platform and document platform have dimensions between about 2 inches by about 3.5 inches.

66. The device of claim 59 wherein the lens platform has a shape chosen from the group consisting of rectangular, square, circular, oval, freeform, octagonal or hexagonal.

67. The device of claim 59 wherein the outer edge of the lens has a shape chosen from the group consisting of circular, rectangular, square, hexagonal, octagonal, pentagonal, oval, freeform or a specific shape such as the outline of a state or country.

68. The device of claim 59 wherein the document platform has a shape chosen from the group consisting of rectangular, square, circular, oval, freeform, octagonal or hexagonal.

69. The device of claim 59 wherein the document cover is affixed to the document platform by a hinge.

70. A device for creating a magnified image of a document comprising:

- a lens having an outer edge, the lens capable of producing a virtual image;
- a lens platform for positioning the lens, the lens platform having an outer edge;
- a document platform having an outer periphery and a first and second side, the first side capable of contacting the document;
- a collapsible positioning member connecting the lens platform to the document platform for positioning the lens platform a distance from the document to produce a virtual image of the document wherein the collapsible positioning member is open to allow ambient light to pass around the collapsible positioning member and impinge on the document; and
- a document covet to hold a document in close association with the document platform, the document cover having an outer periphery wherein the document cover is permanently affixed to the document platform and wherein the document platform has at least one physical restraint member located on the document platform and dimensioned to wrap around and constrain an outer edge of a document placed on the document platform.

71. The device of claim 70 wherein the lens is chosen from the group consisting of a convex lens, a bi-convex lens, an aspheric lens and a Fresnel lens.

72. The device of claim 70 wherein the collapsible positioning member moves the lens platform near the document platform to produce a substantially flat device.

73. The device of claim 70 wherein the lens platform and document platform is roughly rectangular.

74. The device of claim 73 wherein the lens platform and document platform have dimensions between about 3.5 inches by about 5 inches.

75. The device of claim 74 wherein the lens platform and document platform have dimensions between about 3 inches by about 3.5 inches.

76. The device of claim 75 wherein the lens platform and document platform have dimensions between about 2 inches by about 3.5 inches.

77. The device of claim 70 wherein the lens platform has a shape chosen from the group consisting of rectangular, square, circular, oval, freeform, octagonal or hexagonal.

78. The device of claim 70 wherein the outer edge of the lens has a shape chosen from the group consisting of circular, rectangular, square, hexagonal, octagonal, pentagonal, oval, freeform or a specific shape such as the outline of a state or country.

79. The device of claim 70 wherein the document platform has a shape chosen from the group consisting of rectangular, square, circular, oval, freeform, octagonal or hexagonal.

80. The device of claim 70 wherein the document cover is affixed to the document platform by a hinge.

* * * * *